United States Patent
Bae et al.

(10) Patent No.: US 11,122,404 B2
(45) Date of Patent: Sep. 14, 2021

(54) ELECTRONIC DEVICE, EXTERNAL ELECTRONIC DEVICE, AND METHOD OF MANAGING EMBEDDED SUBSCRIBER IDENTITY MODULES OF EXTERNAL ELECTRONIC DEVICE

(71) Applicant: Samsung Electronics Co., Ltd., Gyeonggi-do (KR)

(72) Inventors: Jeongtak Bae, Gyeonggi-do (KR); Hyongjin Ban, Gyeonggi-do (KR); Jeongdon Kang, Gyeonggi-do (KR); Jieun Jung, Gyeonggi-do (KR); Sangsoo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 37 days.

(21) Appl. No.: 16/531,629

(22) Filed: Aug. 5, 2019

(65) Prior Publication Data
US 2020/0053534 A1 Feb. 13, 2020

(30) Foreign Application Priority Data
Aug. 8, 2018 (KR) .......................... 10-2018-0092456

(51) Int. Cl.
*H04W 4/60* (2018.01)
*H04W 4/50* (2018.01)
(Continued)

(52) U.S. Cl.
CPC .............. *H04W 4/60* (2018.02); *H04W 4/50* (2018.02); *H04W 8/183* (2013.01); *H04W 8/265* (2013.01); *H04W 12/06* (2013.01)

(58) Field of Classification Search
CPC ......... H04W 4/60; H04W 4/50; H04W 12/06; H04W 8/183; H04W 8/265; H04W 12/00401; H04W 12/0023; H04W 8/205
See application file for complete search history.

(56) References Cited

U.S. PATENT DOCUMENTS 9,648,492 B2   5/2017 Mallikarjunan et al.
10,536,844 B2 * 1/2020 Park ...................... H04W 8/245
(Continued)

FOREIGN PATENT DOCUMENTS

CN    101796858 B  *  9/2013  ............ H04W 8/265
GB    2522044 A    *  7/2015  ............ H04W 12/04
(Continued)

OTHER PUBLICATIONS

3rd Generation Partnership Project; Technical Specification Group Services and System Aspects; Syndicated Feed Reception (SFR) within 3GPP Environments; Protocols and Codecs (Release 15), 3GPP TS 26.150, Jun. 2018, 29 pages.
(Continued)

*Primary Examiner* — Charles T Shedrick
(74) *Attorney, Agent, or Firm* — The Farrell Law Firm, P.C.

(57) ABSTRACT

An electronic device is provided. The electronic device a processor configured to, receive a signal for requesting activation of a communication service for the external electronic device, from the external electronic device using the second communication module; transmit device information of the electronic device to the first external server using the first communication module; receive information for activation of the communication service from the first external server; access the second external server on the basis of an address of the second external server which is included in the information for activation of the communication service; and perform activation of the communication service for the external electronic device using data transmitted from the second external server.

20 Claims, 16 Drawing Sheets

(51) Int. Cl.
H04W 12/06 (2021.01)
H04W 8/18 (2009.01)
H04W 8/26 (2009.01)

(56) References Cited

U.S. PATENT DOCUMENTS

| | | |
|---|---|---|
| 2012/0131158 A1 | 5/2012 | Winters et al. |
| 2013/0185813 A1 | 7/2013 | Shim et al. |
| 2016/0050557 A1* | 2/2016 | Park .................. H04W 12/04 |
| | | 455/419 |
| 2016/0080932 A1 | 3/2016 | Jin et al. |
| 2016/0301529 A1* | 10/2016 | Park .................. H04L 63/126 |
| 2016/0330608 A1* | 11/2016 | Benn .................. H04W 12/35 |
| 2016/0366585 A1* | 12/2016 | Fleischman ........... H04W 8/183 |
| 2017/0201850 A1* | 7/2017 | Raleigh ................ G06F 3/0482 |
| 2017/0272121 A1* | 9/2017 | Dao .................... H04W 12/06 |
| 2018/0098178 A1 | 4/2018 | Yerrabommanahalli et al. |
| 2018/0176768 A1 | 6/2018 | Beek et al. |
| 2020/0059778 A1* | 2/2020 | Li ........................ H04W 4/50 |
| 2020/0221293 A1* | 7/2020 | Kim ...................... H04W 4/00 |

FOREIGN PATENT DOCUMENTS

| | | |
|---|---|---|
| KR | 1020170098110 | 8/2017 |
| KR | 1020180070044 | 6/2018 |

OTHER PUBLICATIONS

International Search Report dated Nov. 11, 2019 issued in counterpart application No. PCT/KR2019/009266, 9 pages.
European Search Report dated Feb. 11, 2021 issued in counterpart application No. 19848287.9-1213, 10 pages.

* cited by examiner

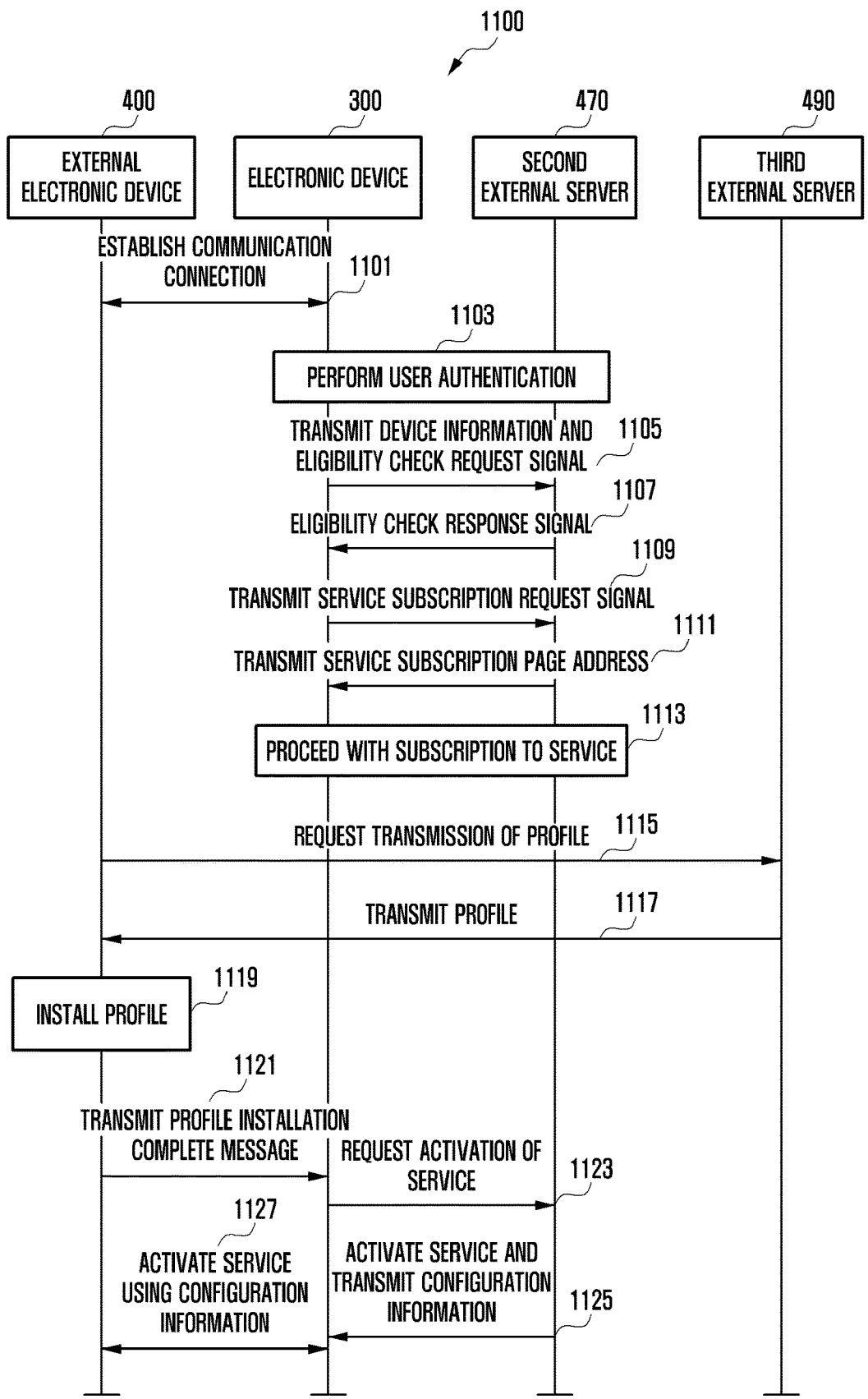

ELECTRONIC DEVICE, EXTERNAL
ELECTRONIC DEVICE, AND METHOD OF
MANAGING EMBEDDED SUBSCRIBER
IDENTITY MODULES OF EXTERNAL
ELECTRONIC DEVICE

CROSS-REFERENCE TO RELATED
APPLICATION(S)

This application is based on and claims priority under 35 U.S.C. § 119(a) to Korean Patent Application Serial No. 10-2018-0092456, filed on Aug. 8, 2018, in the Korean Intellectual Property Office, the entire disclosure of which is incorporated herein by reference.

BACKGROUND

1. Field

The present disclosure relates to an operation method by an electronic device and, more particularly, to a technology of managing an e-subscriber identification module (SIM) of an external electronic device connected to an electronic device.

2. Description of Related Art

An electronic device may use a network provided by a common carrier in order to perform wireless communication. In order to use the network provided by the common carrier, authentication is needed between a server provided by the common carrier and an electronic device and the electronic device may perform authentication with the server provided by the common carrier using a profile stored in the electronic device.

When a plurality of electronic devices include universal integrated circuit cards (UICC) cards, a separate subscription service provided by a communication service provider (e.g., a subscription service provided in a shop operated by a communication service provider) may be used in order to subscribe to or manage a communication service that a plurality of electronic devices may use (e.g., a communication service that uses a cellular network provided by a communication service provider).

In order to perform a communication service activation operation including subscription to a communication service for a plurality of electronic devices, access to a communication service management server operated by a communication service provider or a profile provision server operated by the communication service provider is needed. When an address used for accessing the profile provision server operated by the communication service management server or the communication service provider is not provided, communication service activation may not be performed

SUMMARY

In accordance with an aspect of the present disclosure, an electronic device is provided. The electronic device includes a memory configured to store device information of the electronic device, a first communication module configured to establish a first communication connection to a first external server and a second external server, where the first external server stores information associated with a plurality of operators that provide cellular communication services and the second external server is related to activation of a communication service, a second communication module configured to establish a second communication connection to an external electronic device, and a processor. The processor is configured to receive a signal for requesting activation of a communication service for the external electronic device from the external electronic device using the second communication module, transmit device information of the electronic device to the first external server using the first communication module, receive information for activation of the communication service from the first external server, access the second external server on the basis of an address of the second external server which is included in the information for activation of the communication service, and perform activation of the communication service for the external electronic device using data transmitted from the second external server.

In accordance with an aspect of the present disclosure, an electronic device is provided. The electronic device includes a memory configured to store information associated with operators that provide communication services, a communication module configured to perform data transmission or reception with a first external electronic device using a first communication scheme, and a processor. The processor is configured to receive a first signal for requesting transmission of the information for activation of a communication service transmitted from the first external electronic device, identify device information of the first external electronic device included in the first signal, select an operator corresponding to the device information of the first external electronic device from among the operators, and transmit information for activation of a communication service corresponding to the selected operator to the first external electronic device.

In accordance with an aspect of the present disclosure, an operation method by an electronic device is provided. The method includes receiving a signal for requesting activation of a communication service for an external electronic device from the external electronic device, transmitting device information of the electronic device to a first external server that stores information associated with a plurality of operators that provide communication services, receiving information for activation of the communication service from the first external server, accessing a second external server on the basis of an address of the second external server which is related to activation of the communication service, the address being included in the information for activation of the communication service, and performing activation of the communication service for the external electronic device using data transmitted from the second external server.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 11 is a flowchart of an operation in which an electronic device performs downloading a profile, and installation of the profile in an external electronic device, according to an embodiment.

DETAILED DESCRIPTION

Figure 1:
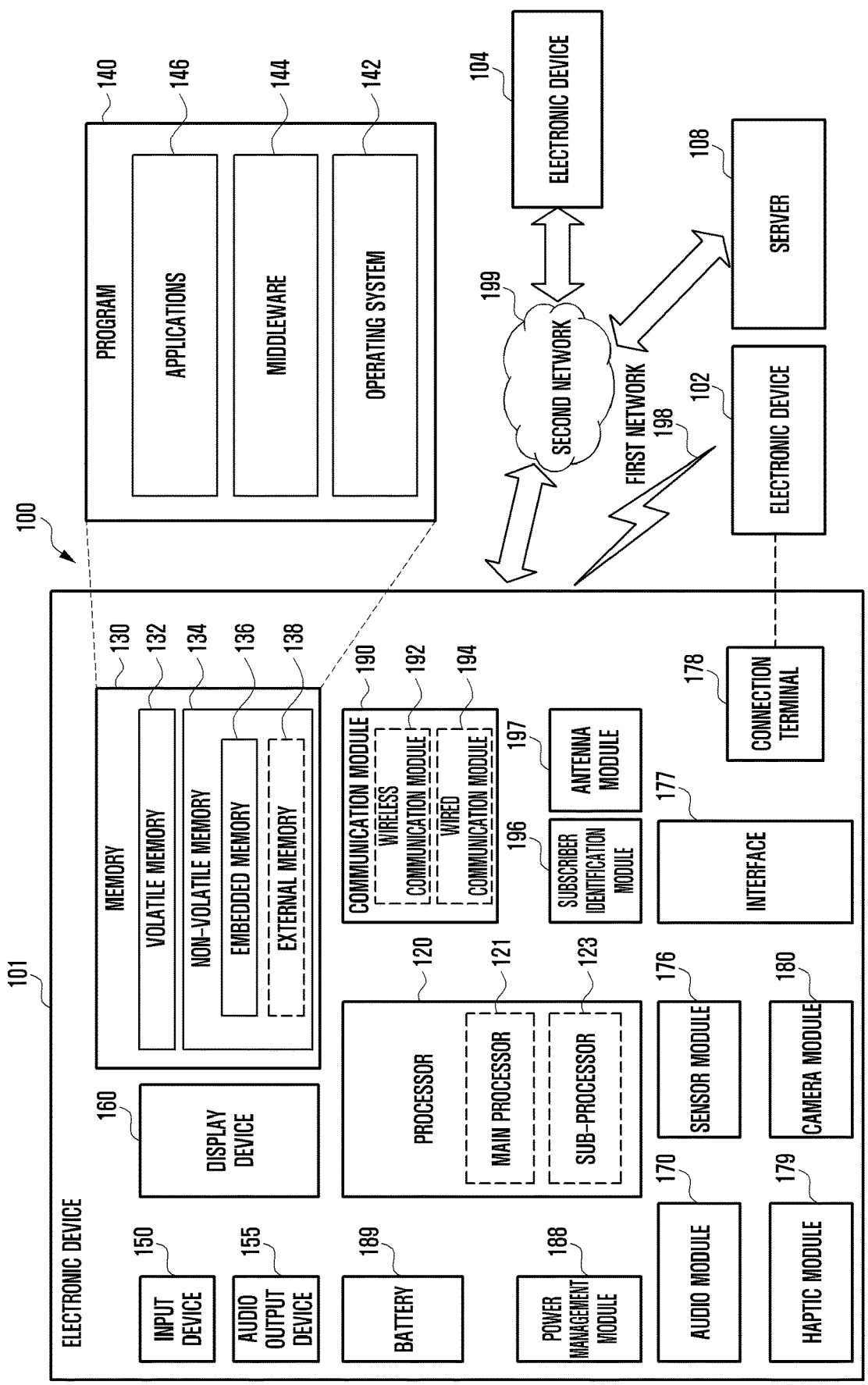
FIG. 1 is a diagram of an electronic device, according to an embodiment.

FIG. 1 is a diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
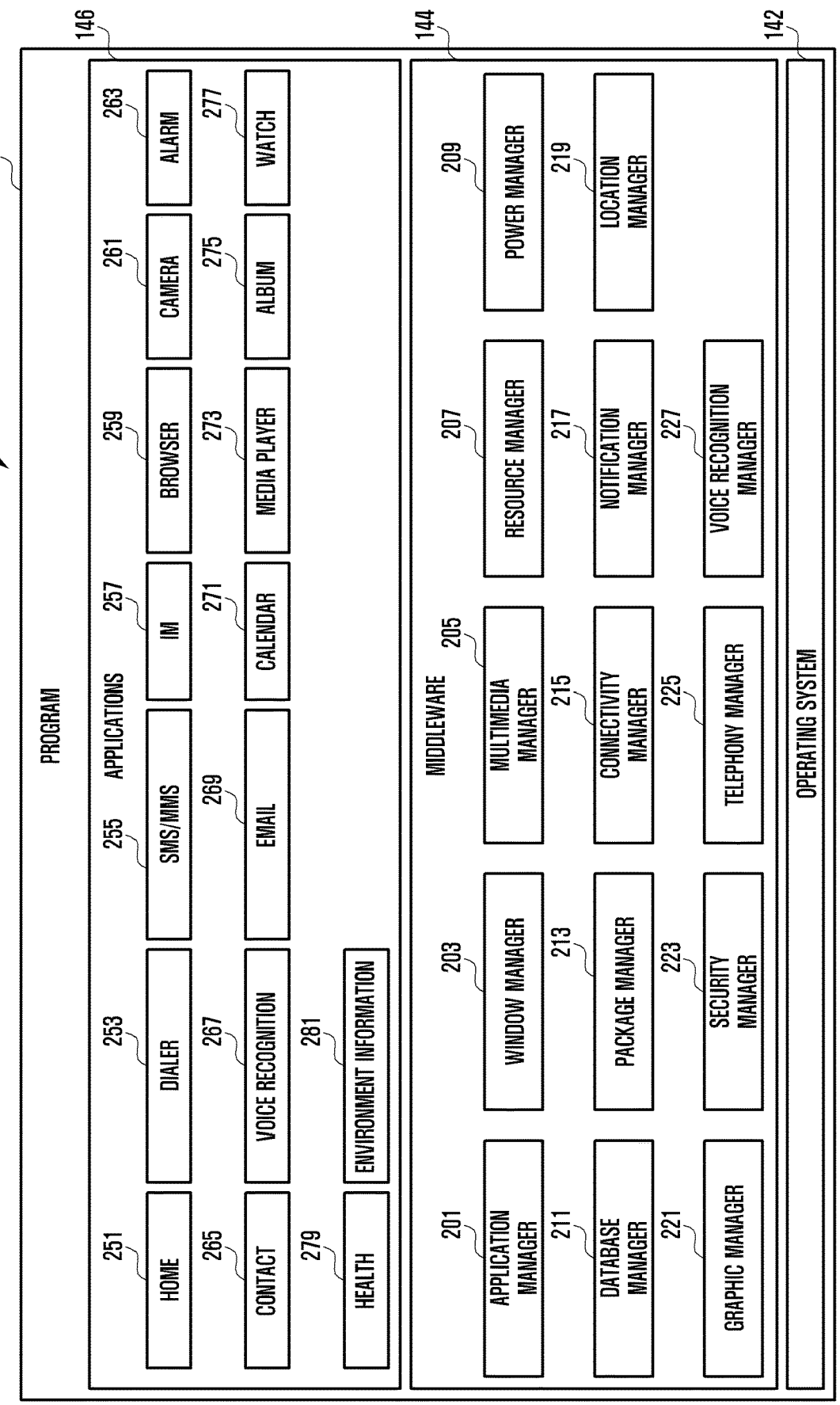
FIG. 2 is a diagram of a program, according to an embodiment.

FIG. 2 is a diagram 200 of the program 140, according to an embodiment. The program 140 may include an operating system (OS) 142 to control one or more resources of the electronic device 101, middleware 144, or an application 146 executable in the OS 142. The OS 142 may include Android™, iOS™, Windows™, Symbian™, Tizen™, or Bada™. At least part of the program 140 may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may manage the life cycle of the application 146. The window manager 203 may manage one or more graphical user interface (GUI) resources that are used on a screen. The multimedia manager 205 may identify one or more formats to be used to play media files, and may encode or decode a corresponding one of the media files using a codec appropriate for a corresponding format selected from the one or more formats. The resource manager 207 may manage the source code of the application 146 or a memory space of the memory 130. The power manager 209 may manage the capacity, temperature, or power of the battery 189, and determine or provide related information to be used for the operation of the electronic device 101 based at least in part on corresponding information of the capacity, temperature, or power of the battery 189. The power manager 209 may interwork with a basic input/output system (BIOS) of the electronic device 101.

The database manager 211 may generate, search, or change a database to be used by the application 146. The package manager 213 may manage installation or update of an application that is distributed in the form of a package file. The connectivity manager 215 may manage a wireless connection or a direct connection between the electronic device 101 and the external electronic device. The notification manager 217 may provide a function to notify a user of an occurrence of a specified event (e.g., an incoming call, message, or alert). The location manager 219 may manage locational information on the electronic device 101. The graphic manager 221 may manage one or more graphic effects to be offered to a user or a user interface related to the one or more graphic effects.

The security manager 223 may provide system security or user authentication. The telephony manager 225 may manage a voice call function or a video call function provided by the electronic device 101. The voice recognition manager 227 may transmit a user's voice data to the server 108, and receive, from the server 108, a command corresponding to a function to be executed on the electronic device 101 based at least in part on the voice data, or text data converted based at least in part on the voice data. The middleware 244 may dynamically delete some existing components or add new components. At least part of the middleware 144 may be included as part of the OS 142 or may be implemented as another software separate from the OS 142.

The application 146 may include a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. The application 146 may further include an information exchanging application (not shown) that is capable of supporting information exchange between the electronic device 101 and the external electronic device. The information exchange application may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

A UICC is a smart card that is inserted into a mobile communication terminal and is used, and indicates a chip that stores personal information of a mobile communication subscriber such as network access authentication information, a phone number, an SMS, authenticates a subscriber, and generate a traffic security key when access to a mobile communication network such as GSM, WCDMA, and LTE is performed, whereby secure use of mobile communication is enabled. The UICC may contain a communication application, such as a SIM, a universal SIM (USIM), or an IP multimedia SIM (ISIM) according to the type of a mobile communication network to which a subscriber connects. Also, a high level security function may be provided in order to contain various applications such as an electronic wallet, ticketing, electronic passport or the like.

An embedded UICC may be a security module in the form of a chip embedded in a terminal, as opposed to being inserted to and attachable to or detachable from a terminal. The eUICC may download and install a profile using an over the air (OTA) technology. The eUICC may be referred to as a UICC that is capable of downloading and installing a profile.

Herein, a method of downloading a profile and installing the same in an eUICC using the OTA technology may be also applied to a detachable UICC that can be inserted into and detached from a terminal. A UICC that is capable of downloading and installing a profile using the OTA technology may be applied.

The term "UICC" may be interchangeable with a SIM, and term "eUICC" may be interchangeable with an embedded SIM (eSIM).

A profile may be an object obtained by packaging an application, a file system, or an authentication key value stored in a UICC, in the form of software.

A USIM profile may have the same meaning as a profile, or may indicate an object obtained by packaging information included in a USIM application in a profile, in the form of software.

A profile provision server may be referred to as a subscription manager data preparation (SM-DP), a subscription manager data preparation plus (SM-DP+), an off-card entity of profile domain, a profile encryption server, a profile generation server, a profile provisioner (PP), a profile provider, a PPC holder (profile provisioning credentials holder), or a server.

A profile information transfer server may be referred to as a discovery and push function (DPF), or a subscription manager discovery server (SM-DS).

A profile management server may be referred to as subscription manager secure routing (SM-SR), subscription manager secure routing plus (SM-SR+), an off-card entity of an eUICC profile manager or a profile management credentials (PMC) holder, or an eUICC manager (EM).

A profile server may be expressed as a server that is capable of performing one or more of the operations performed by a profile provision server, a profile management server, and a profile information transfer server.

The term "terminal" used in this specification may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a moving node, a mobile, or other terms. Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music and having a wireless communication function, an Internet home appliance capable of performing wireless Internet access and browsing, and portable units or terminals having integrated combinations of the functions thereof. Furthermore, a terminal may include, but is not limited to a machine to machine (M2M) terminal and a machine type communication (MTC) terminal/device. The terminal may be referred to as an electronic device.

An electronic device or an external electronic device may include a UICC that is capable of downloading and installing a profile. When a UICC is not embedded in an electronic device, the UICC that is physically separated from the electronic device may be inserted to the electronic device such that the UICC is connected to the electronic device. The UICC may be inserted in an electronic device in the form of a card. The electronic device may include the terminal. In this instance, the terminal may include a UICC that is capable of downloading and installing a profile. The UICC may be embedded or inserted in the terminal. The UICC that is capable of downloading and installing a profile may be referred to as an eUICC.

A profile separator may be referred to as a factor that matches a profile identifier (profile ID), an integrated circuit card ID (ICCID), an ISD-P, or a profile domain (PD). A profile ID may indicate a unique identifier of each profile.

An eUICC identifier (eUICC ID) may be a unique identifier of an eUICC embedded in a terminal, or may be referred to as an eUICC ID (EID). Alternatively, when a provisioning profile is contained in an eUICC, the eUICC identifier may be a profile ID of the provisioning profile. Alternatively, when a terminal and an eUICC chip are not separated from each other, the eUICC identifier may be a terminal ID. Alternatively, the eUICC identifier may be referred to as a predetermined secure domain of an eUICC chip.

Hereinafter, an electronic device according to various embodiments will be described.

Figure 3:
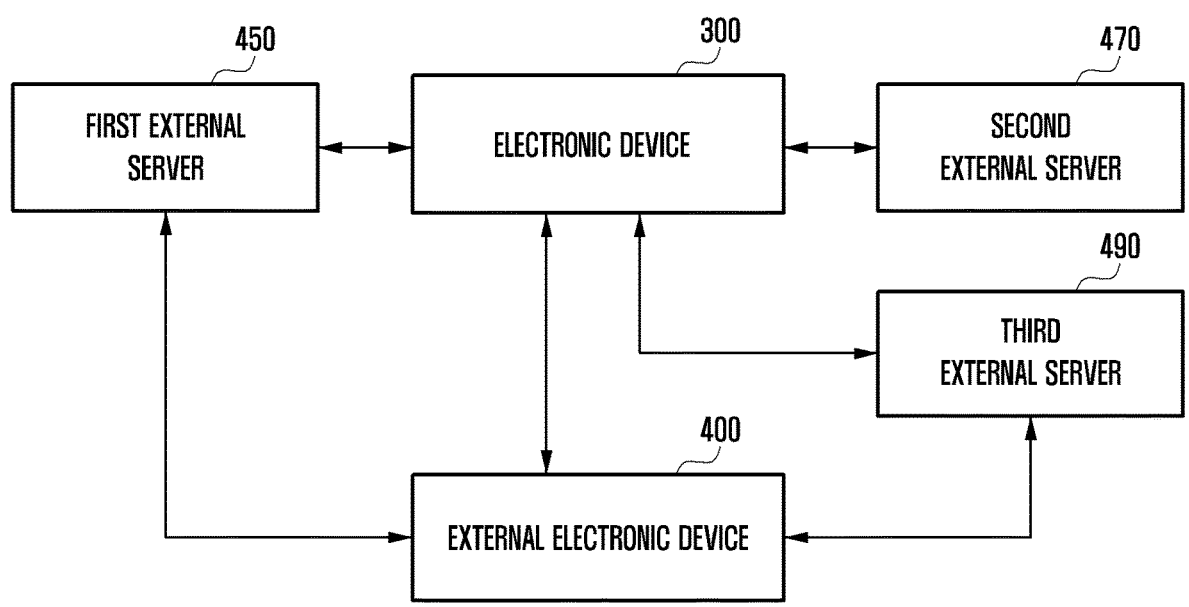
FIG. 3 is a diagram illustrating the relationship among an electronic device, an external electronic device, a first external server, a second external server, and a third external server, according to an embodiment.

FIG. 3 is a diagram illustrating the relationship among an electronic device 300, an external electronic device 400, a first external server 450, a second external server 470, and a third external server 490, according to an embodiment.

The electronic device 300, the external electronic device 400, the first external server 450, the second external server 470, and the third external server 490 may include at least some of the various elements included in the electronic device 101 of FIG. 1.

The electronic device 300 may be connected to the external electronic device 400 via various communication schemes (e.g., various communication schemes capable of transmitting and/or receiving data, for example, short-range communication schemes such as Bluetooth, NFC, and Wi-Fi or long-range communication schemes such as LTE or 5G) The electronic device 300 may perform an operation such that the external electronic device 400 activates a communication service provided by a communication service provider (e.g., an operator that provides a data transmission and/or reception support service using various communication schemes). The electronic device 300 may establish a communication connection to the first external server 450 such that the external electronic device 400 is capable of performing data transmission and/or reception with the first external server 450. The electronic device 300 may transmit, to the first external server 450, a signal for requesting device information of the electronic device 300 and information for activating the communication service for the external electronic device 400, transmitted from the external electronic device 400.

The electronic device 300 may access the address of the second external server 470 included in the communication service activation information. The electronic device 300 may activate the communication service for the external electronic device 400 using data transmitted to and/or received from the second external server 470. The electronic device 300 may perform subscription to a communication service. The electronic device 300 may perform at least a part of management of a communication service usable by the external electronic device 400 (e.g., changing a communication service payment system, deactivating a communication service, or cancelling a communication service).

When subscription to a communication service is completed, the second external server 470 may generate a profile to be installed in the external electronic device 400. The profile to be installed in the external electronic device 400 may be stored in the third external electronic server 490. The external electronic device 400 may receive the profile from the third external server, and may install the profile in the external electronic device 400. The external electronic device 400 may transmit a message indicating the result of installing the profile to the electronic device 300.

The external electronic device 400 may indicate an electronic device that transmits and/or receive various types of data using a communication service provided by a communication service provider. The external electronic device 400 may include smart phones, wearable devices, or all of various electronic devices that support network communication. A profile may be installed in the external electronic device 400 so that the external electronic device 400 may use a communication service provided by a communication service provider.

The external electronic device 400 may contain a UICC that is capable of downloading and installing a profile. Alternatively, a UICC that is physically separated from the external electronic device 400 may be inserted in an electronic device and may be connected to the electronic device. The UICC may be inserted in the external electronic device 400 in the form of a card. The UICC may be embedded in the external electronic device 400, or may be inserted in the external electronic device 400 so as to be connected to the external electronic device 400. The UICC that is capable of downloading and installing a profile may be referred to as an eUICC. The profile may indicate access information used for accessing a common carrier that manages communication that the external electronic device uses. The access information may include an IMSI which is a type of subscriber identifier, and may include a value needed for authentication for using a network provided by the common carrier.

The first external server 450 may store information associated with at least one operator that provides a communication service usable by the electronic device 300 and the external electronic device 400. The first external server 450 may receive device information that the electronic device 300 or the external electronic device 400 transmits, and may select an operator that provides a communication service usable by the electronic device 300 or the external electronic device 400 from among operators stored in the first external server 450, on the basis of the device information. The first external server 450 may transmit information for activating a service provided by the selected operator to the electronic device 300 or the external electronic device 400.

The second external server 470 may indicate a server (e.g., an entitlement server) that manages eligibility for a communication service used by the external electronic device 400 or the electronic device 300. The second external server 470 may store information associated with a payment system usable by a user of the electronic device 300 or the external electronic device 400 and/or information associated with at least one service usable by the external electronic device 400, and may transmit an identifier of each of at least one service usable by the user of the electronic device 300 or the external electronic device 400 to the electronic device 300 or the external electronic device 400 in response to a request from the electronic device 300 or the external electronic device 400. Alternatively, the second external server 470 may determine whether the electronic device 300 or the external electronic device 400 is eligible to use a communication service on the basis of data transmitted by the electronic device 300 (e.g., device information of the electronic device 300 and/or device information of the external electronic device 400). The second external server 470 may have lower security level than that of the third external server 490 that provides a profile. The second external server 470 may provide data (at least one identifier or configuration information related to a communication service) that requires lower security than that of a profile.

The configuration information related to the communication service may indicate data usable for activation or deactivation of the communication service. The configuration information related to the communication service may include information indicating activation or deactivation of at least one communication service or information indicating activation or deactivation of at least some of the functions related to the communication service (e.g., information provided in the form of a flag, such that data indicating activation of a function is expressed as "1", and data indicating deactivation of a function is expressed as "0"). Alternatively, the configuration information related to the communication service may include various types of information such as information indicating whether to activate other services related to the communication service corresponding to the configuration information.

The third external server 490 may generate and store a profile on the basis of information associated with a communication service (e.g., eligibility to use a communication service) used by the electronic device 300 or the external electronic device 400, the information being transmitted from the second external server 470. The third external server 490 may transmit the profile to the electronic device 300 or the external electronic device 400.

FIG. 3 illustrates the one external electronic device 400. However, it is only for ease of description, and a plurality of external electronic devices 400, which may be connected to the electronic device 300, may be used.

Figure 4A:
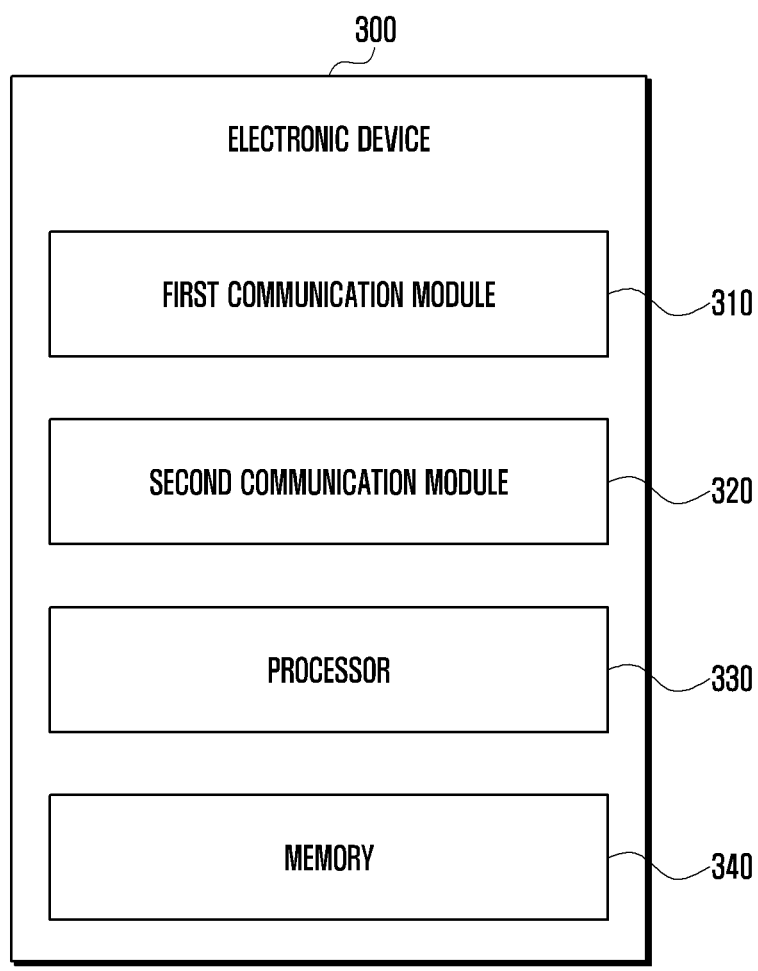
FIG. 4A is a diagram of an electronic device, according to an embodiment.

FIG. 4A is a diagram of an electronic device, according to an embodiment.

Referring to FIG. 4A, the electronic device 300 may include a first communication module 310, a second communication module 320, a processor 330, and a memory 340.

The first communication module 310 may establish a first communication connection corresponding to a first communication scheme, with a first external server 450, a second external server 470, and a third external server 490, and may perform data transmission or reception with the first external server 450. The first communication scheme may indicate all communication schemes (e.g., a cellular communication scheme, a Wi-Fi communication scheme, and the like) which are capable of establishing connection to the first external server 450, the second external server 470, and the third external server 490.

The second communication module 320 may establish, with the external electronic device 400, a second communication connection corresponding to a second communication scheme (e.g., short-range communication scheme such as Bluetooth™, NFC, Wi-Fi direct).

An external electronic device 400 may transmit a signal for requesting activation of a cellular communication service to the electronic device 300 via the second communication scheme. When the external electronic device 400 is connected to the electronic device 300 using the second communication connection for the first time, a signal for requesting activation of the communication service for the external electronic device 400 may be transmitted to the electronic device 300.

The processor 330 may receive a signal for requesting activation of the communication service transmitted from the external electronic device 400, and transmits device information of the electronic device 300 to the first external server 450.

The device information of the electronic device 300 may indicate all types of information used for selecting a communication operator that provides a communication service usable by the electronic device 300 and the external electronic device 400 from among a plurality of pieces of communication operator information stored in the first external server 450. The device information of the electronic device 300 may include a mobile country code (MCC) and a mobile network code (MNC).

The first external server 450 may receive device information of the electronic device 300, and may transmit information for activation of a communication service which corresponds to the device information of the electronic device 300. The information for activation of a communication service may include at least some of information indicating an identifier used when an operator that provides a communication service identifies a subscriber (e.g., an ICCID, IMSI, or IMEI), the address of the third external server 490, SIM card information provided by a communication service operator, at least one activation scheme for activating a communication service (e.g., an online opening scheme using the second external server 470, an offline opening scheme performed in a shop of a communication operator, an activation code-based opening scheme that inputs an activation code so as to activate a communication service), activation scheme information including priority information associated with a communication service activation scheme, information associated with whether a communication service activation scheme using the second external server 470 is supported, and/or information indicating whether a service providable to a plurality of electronic devices (e.g., the electronic device 300 and the external electronic device 400) on the basis of the same phone number is supported (e.g., an one-number service that enables call transmission or reception using the same phone number).

The external electronic device 400 may be in the state in which a communication service (e.g., a cellular network) is not yet activated, or may be in the state in which data transmission and/or reception with the first external server 450 is not allowed. The processor 330 may support the external electronic device 400 to perform data transmission and/or reception with the first external server 450. The processor 330 may receive data, transmitted by the external electronic device 400, via the second communication module 320, and may transmit data, transmitted by the external electronic device 400, to the first external server 450 via the first communication module 310. The processor 330 may receive data, transmitted by the first external server 450, via the first communication module 310, and may transmit the received data to the external electronic device 400 via the second communication module 320.

The processor 330 may access the address of the second external server 470 included in the information for activating the communication service, and may perform an operation for activating the communication service for the external electronic device 400 using the second external server 470 (e.g., an operation of subscribing to the communication service for the external electronic device 400).

The processor 330 may identify whether a communication operator supports activation of the communication service in the offline state at a shop of the communication operator, on the basis of the activation scheme information included in the information for activation transmitted by the first external server 450. The processor 330 may identify that the communication operator supports activation of the communication service in the offline state at the shop of the communication operator, and may transmit the address of the third external server 490 included in the information for activation to the external electronic device 400. The external electronic device 400 may download a profile from the third external server 490 using the address of the third external server 490.

The processor 330 may identify whether the communication operator supports activation of the communication service using the second external server 470, on the basis of the information for activation transmitted by the first external server 450. The processor 330 may identify that the activation of the communication service using the second external server 470 is supported, and may access the second external server 470 using the address of the second external server 470 included in the information for activation and an authentication method (e.g., a shared token, EAP-AKA, SMS OTP, IP Auth, or open ID connect) for accessing the second external server 470. The processor 330 may activate the communication service using the second external server 470.

The processor 330 may transmit, to the second external server 470, an identifier which is included in the information for activation of the communication service and is used when the operator that provides the communication service identifies a subscriber. The second external server 470 may transmit a web address at which a service (e.g., a payment system) usable by the external electronic device 400 can be selected, to the electronic device 300 on the basis of the identifier transmitted by the electronic device 300. The processor 330 may receive the web address, and may receive a user input provided by a user to select a service on the web page. The processor 330 may transmit the user input to the second external server 470.

The second external server 470 may identify whether a service (payment system) that the electronic device 300 subscribes to has a valid eligibility to use a communication service using the external electronic device 400, on the basis of the identifier.

The second external server 470 may search for at least one service usable by the external electronic device 400 using the received identifier, and may activate a service usable by the external electronic device 400. The second external server 470 may subscribe to the communication service for the external electronic device 400 on the basis of the user input, and may transmit a signal for requesting generation of a profile to the third external server 490 when the subscription to the communication service is completed. The third external server 490 may generate the profile on the basis of data transmitted from the second external server 470.

The processor 330 may identify whether the communication operator supports activation of the communication service using an activation code, on the basis of the information for activation transmitted by the first external server 450. The activation code may indicate a key to be input for activation of a communication service. The activation code may be implemented as a key obtained by combination of characters, numbers, or special characters, or may be implemented in the form of a QR-code. The processor 330 may identify that the activation of the communication service using an activation code is supported, and may perform an operation of requesting input of an activation code.

Although not illustrated, the electronic device 300 may further include a display 160 and/or a camera 180. The processor 330 may control a display to display a screen that requests a user to input an activation code, or may control a camera to receive a QR code.

The processor 330 may sequentially perform the above-described three activation schemes on the basis of priority information of the activation schemes included in the activation scheme information. The activation scheme information may include priority information of the scheme in which the operator that provides the communication service activates the communication service in the offline state, the scheme in which the operator activates the communication service in the online state, and the scheme of activating the communication service using an activation code. The processor 330 may attempt an operation of activating the communication service for the external electronic device 400 using an activation scheme having the highest priority (e.g., the scheme of activating the communication service in the offline state) among the three activation schemes. The processor 330 may identify that activation of the communication service for the external electronic device 400 using the activation scheme with the highest priority fails, and may attempt an operation of activating the communication service for the external electronic device 400 using an activation scheme with a second highest priority.

The external electronic device 400 may receive, from the third external server 490 via the first communication module 410, data required for installing a profile in the eUICC included in the external electronic device 400. The data needed to install the profile may be received from the third external server 490 (e.g., SM-DP+ server) provided by the communication service operator. The data required for installing the profile may be in the form of an encrypted profile package. The encryption of the profile may be performed according to the standard specification defined in SGP.22, but is not limited thereto.

Figure 4B:
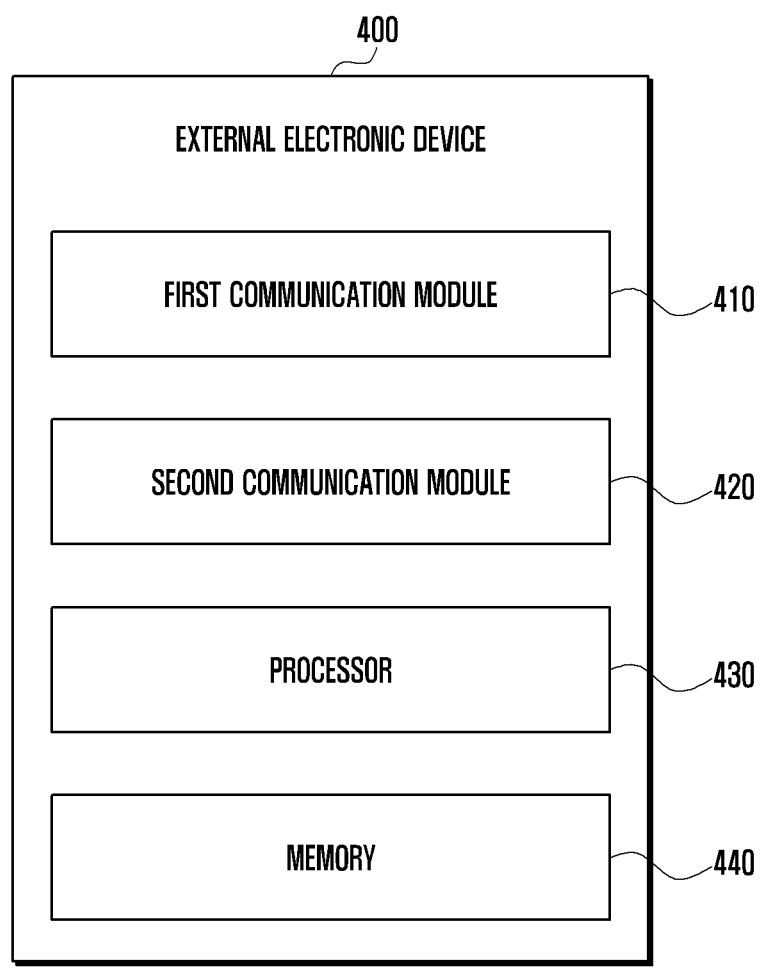
FIG. 4B is a diagram of an external electronic device, according to an embodiment.

FIG. 4B is a diagram of an external electronic device, according to an embodiment.

Referring to FIG. 4B, the external electronic device 400 may include a first communication module 410, a second communication module 420, a processor 430, and a memory 440.

The first communication module 410 may establish a first communication connection corresponding to a first communication scheme (e.g., a cellular network or Wi-Fi) with a first external server 450, a second external server 470, or a third external server 490.

The second communication module 420 may establish, with an electronic device 300, a second communication connection corresponding to a second communication scheme (e.g., short-range communication scheme such as Bluetooth™, NFC, Wi-Fi direct).

Device information of the external electronic device 400 may be stored in the memory 440. The device information of the external electronic device 400 may include identification information of the external electronic device 400 (e.g., an identifier of a SIM module (eSIM identifier (EID)) of the external electronic device 400, an IMSI of the external electronic device, and various identification information including IMEI information that is capable of distinguishing the external electronic device 400 from other electronic devices).

The processor 430 may receive a user input for activating a communication service, and may transmit the device information of the external electronic device 400 to the electronic device 300 using the second communication scheme. The device information of the external electronic device 400 may be used when the second external server 470 performs an operation for activation of a communication service for the external electronic device 400. The device information of the external electronic device 400 may be used when the second external server 470 searches for a service usable by the external electronic device 400. The external electronic device 400 may transmit the device information of the external electronic device 400 to the electronic device 300. The electronic device 300 may access the second external server 470 using the address of the second external server 470 included in information for activation of a communication service, received from the first external server 450. The electronic device 300 may transmit the device information of the external electronic device 400 to the second external server 470.

The processor 430 may perform data transmission and/or reception with the first external server 450. When the activation of the communication service for the external electronic device 400 is not performed, the external electronic device 400 may not use a cellular network. The external electronic device 400 may perform data transmission and/or reception with the first external server 450 using a communication network supported by the electronic device 300. The processor 430 may transmit device information of the electronic device 300 to the first external server 450 and may receive the information for activation of the communication service transmitted from the first external server 450, using the communication network supported by the electronic device 300.

The processor 430 may receive data required for installing a profile in an eUICC included in the external electronic device 400 from the third external server 490 via the first communication module 410. The data needed to install the profile may be received from the third external server 490 (e.g., SM-DP+ server) provided by the communication service provider. The data required for installing the profile may be in the form of an encrypted profile package. The encryption of the profile may be performed according to the standard specification defined in SGP.22, but is not limited thereto. The processor 430 may receive the profile package, and may install the profile using the profile package.

The processor 430 may not establish a connection to the electronic device 300, and the external electronic device 400 may solely receive a user input for activating the communication service.

The processor 430 may establish a first communication connection to the first external server 450 using the first communication module 410. When the activation of the communication service for the external electronic device 400 is not performed, the external electronic device 400 may not use a cellular network, and the processor 430 may establish the first communication connection to the first external server 450 using Wi-Fi. The processor 430 may control the second communication module 420 so as to be connected to an AP existing around the external electronic device 400.

The processor 430 may request a list of countries that support an activation scheme in which the external electronic device 400 solely performs activation of the communication service, from the first external server 450 via the first communication module 410. The first external server 450 may transmit, to the external electronic device 400, the list of countries that support the activation scheme in which the external electronic device 400 solely performs activation of the communication service.

The external electronic device 400 may further include a display and/or a GNSS communication module (e.g., a GPS module) 190. The processor 430 may control a display to display the countries included in the list of countries. The processor 430 may identify the location of the external electronic device 400 using the GNSS communication module 190 of the external electronic device 400 or a mobile country code of an emergency network, and may change the list of countries to display a country corresponding to the location first.

The processor 430 may receive a user input for selecting one of the countries included in the list of countries, and may transmit information indicating the selected country to the first external server 450. The first external server 450 may transmit, to the external electronic device 400, a list of at least one communication operator corresponding to the selected country, and communication service activation information corresponding to each of the at least one communication operator.

The processor 430 may control the display 160 to display a list of communication operators that the first external server 450 transmits, and may receive a user input for selecting one of the at least one communication operator included in the list.

The processor 430 may access the third external server 490 corresponding to the selected communication operator. The third external server 490 may provide a profile. The profile may be received from the third external server 490.

Figure 4C:
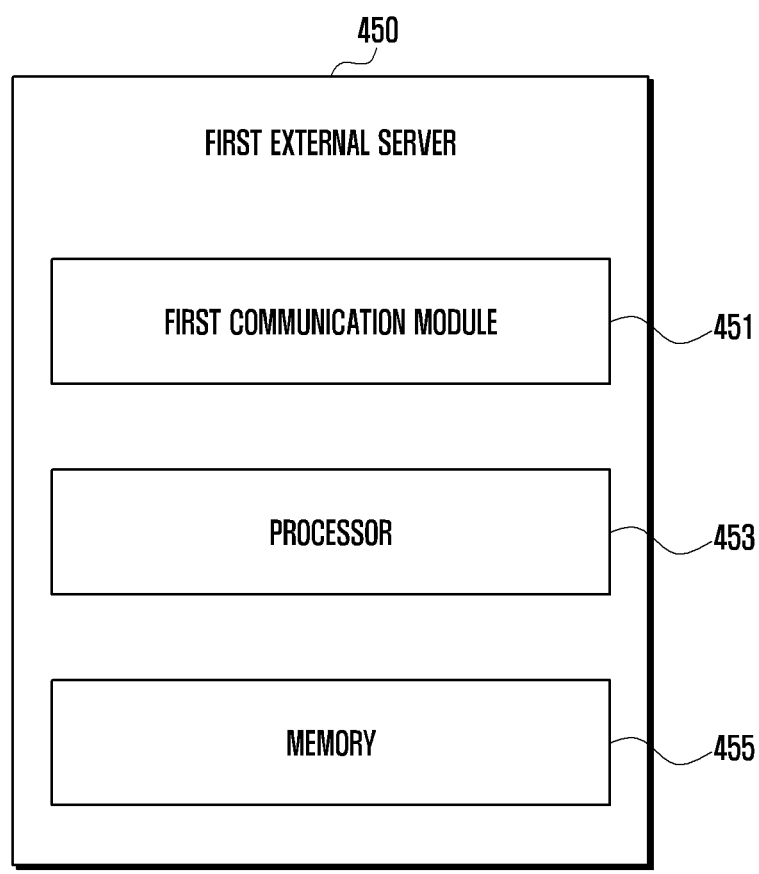
FIG. 4C is a diagram of a first external server, according to an embodiment.

FIG. 4C is a diagram of the first external server 450, according to an embodiment.

The first external server 450 may include a first communication module 451, a processor 453, and a memory 455.

The first communication module 451 may perform data transmission or reception with an electronic device 300 or an external electronic device 400 via a wired network (e.g., a LAN or a WAN).

The memory 455 may store information associated with operators that provide communication services. The information associated with the operators that provide communication services may include information for activation of a communication service corresponding to each operator.

Information for activation of a communication service may include data indicating whether activation schemes for a communication service of each communication operator are supported. The information for activation of a communication service may be implemented as shown in Table 1 below.

TABLE 1

| MCC/MNC | Whether offline activation scheme is supported | Whether online activation scheme is supported | Whether activation scheme using activation code is supported |
|---|---|---|---|
| AAA/BBB | O | O | O |
| CCC/DDD | O | X | X |
| EEE/FFF | X | O | O |

Referring to Table 1, an MCC/MNC combination is different for each operator, and information for activation of a communication service may include data indicating whether an offline communication service activation scheme, an online communication service activation scheme, and/or an activation scheme using an activation code is supported for each operator.

Information of operators that provide communication services may include information indicating an identifier that an operator providing a communication service uses as an identifier for identifying terminals that request subscription. The identifier used for identifying terminals may be one of an ICCID, an IMSI or an IME). Information indicating that operator A uses an ICCID in order to identify a terminal that requests subscription or information indicating that operator B uses an IMSI in order to identify a terminal that requests subscription may be included in the memory 455.

Information of operators that provide communication services may include the address of the third external server 490 operated by a communication service operator.

The information associated with operators that provide communication services may include information for identifying a communication service operator. The information for identifying a communication service operator may include at least one of an MCC, an MNC, a group identifier level 1, a group identifier level 2, a service operator name (SPN), or an ICCID. The processor 453 may receive device information of the electronic device 300 including a mobile country code and a mobile network code, transmitted from the electronic device 300, and may identify a communication service operator corresponding to the device information of the electronic device 300.

Although operators that provide communication services are different, they may have the same MCC and MNC. A mobile virtual network operator (MVNO), which does not have a mobile physical network, but provides a mobile communication network of another operator that provides a communication service, may have the same MCC and MNC as the MCC and MNC of the operator that provides the mobile communication network to the mobile virtual network operator. When a plurality of communication service operators correspond to the device information of the electronic device 300 (or a plurality of communication service operators have the same MCC and MNC), the processor 453 may select one of the plurality of communication service operators using another identifier (e.g., GID1, GID2, or SPN) excluding the MCC and MNC, and may transmit, to the electronic device 300, communication service activation information which is to be transmitted to the selected communication service operator.

When a plurality of communication service operators correspond to the device information of the electronic device 300, the processor 453 may transmit communication service activation information of the plurality of communication service operators to the electronic device 300. When a plurality of communication service operators correspond to the device information of the electronic device 300, the processor 453 may transmit communication service activation information including information for identifying a communication service operator. In this instance, the electronic device 300 may select one of the plurality of communication service operators using the communication service activation information, and may activate the communication service for the external electronic device 400 using the communication service activation information corresponding to the one communication service operator. When a single communication service operator corresponds to the device information of the electronic device 300, the processor 453 may transmit communication service activation information excluding information for identifying a communication service operator.

Information of operators that provide communication services may include activation scheme information including information associated with at least one activation scheme for activating a communication service, and priority information associated with an activation scheme.

Operators that provide communication services may support at least one activation scheme from among an online activation scheme using the second external server 470, an offline activation scheme performed at a shop of a communication operator, an activation code-based activation scheme that activates a communication service by inputting an activation code, and an activation scheme using the external electronic device 400 without a connection to the electronic device 300. The information associated with at least one activation scheme for activating a communication service may include activation schemes supportable by operators that provide communication services and/or priority information allocated to an activation scheme.

The information associated with operators that provide communication schemes may include whether the activation scheme that activates a communication service using the second external server 470 is supported. When the communication service activation scheme using the second external server 470 (e.g., the online activation scheme) is supported, the information associated with operators that provide communication services may include the address of the second external server 470, and information associated with a scheme of performing authentication in order to access the second external server 40 (e.g., shared token, EAP-AKA, SMS OTP, IP Auth, or open ID connect).

The information associated with operators that provide communication services may include information indicating whether a service which is providable to both the electronic device 300 and the external electronic device 400 on the basis of the same phone number (e.g., a one-number service that transmits or receive a call on the basis of the same phone number) is supported. When one-number service is supported, the information associated with operators that provide communication services may include information indicating whether a service (call fork) that forwards a phone call that the electronic device 300 receives, a message sync service that synchronizes a message and phone call transmission/reception history between the electronic device 300 and the external electronic device 400, and/or a phone call history sync service is supported.

Figure 4D:
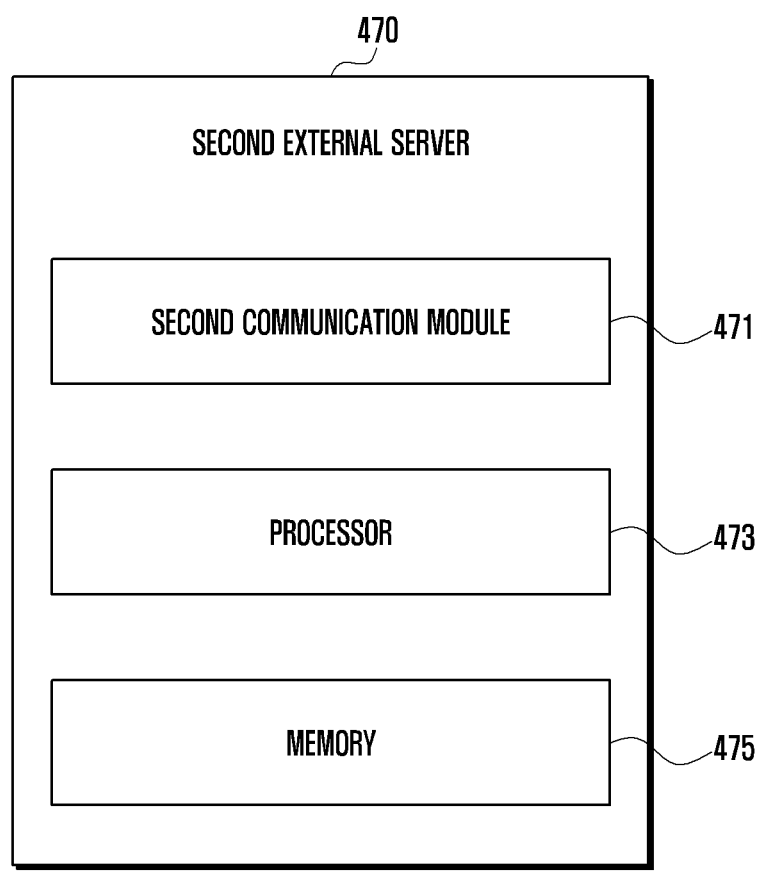
FIG. 4D is a diagram of a second external server, according to an embodiment.

FIG. 4D is a diagram of a second external server, according to an embodiment.

Referring to FIG. 4D, the second external server 470 according to an embodiment may include a first communication module 471, a processor 473, and a memory 475.

The first communication module 451 may perform data transmission or reception with an electronic device 300 or the external electronic device 400 via a wired network (e.g., a LAN or a WAN).

The processor 473 may establish a communication connection to the electronic device 300 or the external electronic device 400 using the first communication module 471. The processor 473 may receive a signal for requesting a communication connection, transmitted from the electronic device 300, and may control the first communication module 471 in order to establish a communication connection to the electronic device 300.

The processor 473 may receive device information of the electronic device 300, transmitted from the electronic device 300. The processor 473 may search for a communication service usable by an external electronic device 400 connected to the electronic device 300 on the basis of the device information of the electronic device 300, and may transmit, to the electronic device 300, identifiers of communication services usable by the external electronic device 400.

The processor 473 may receive a signal for requesting activation of a communication service, transmitted from the electronic device 300, and may perform activation of a communication service. The processor 473 may transmit, to the electronic device 300, configuration information related to a communication service corresponding to the activation request signal. The configuration information related to the communication service may be used when the electronic device 300 and the external electronic device 400 activate the communication service.

The processor 473 may receive a communication service activation request signal transmitted from the external electronic device 400, and may perform activation of a communication service. The processor 473 may transmit, to the external electronic device 400, configuration information related to a communication service corresponding to the activation request signal. The configuration information related to the communication service may be used when the external electronic device 400 activates the communication service.

The memory 475 may transitorily or non-transitorily store device information of the electronic device 300 and the external electronic device 400, a list of at least one service usable by the external electronic device 400, and configuration information related to the service.

Figure 5:
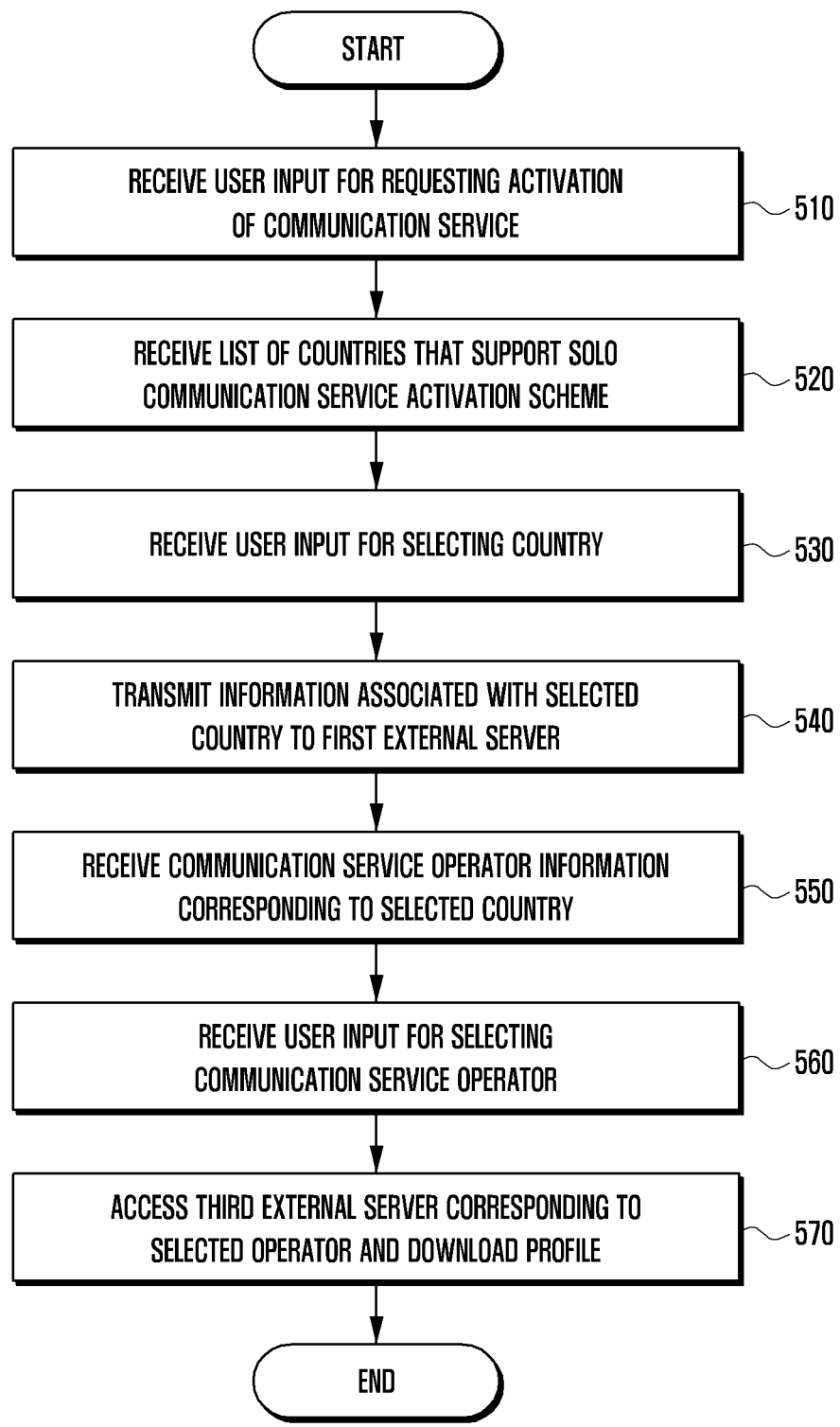
FIG. 5 is a flowchart of an operation in which an external electronic device solely performs opening of a communication service, according to an embodiment.

FIG. 5 is a flowchart of an operation in which an external electronic device solely performs opening of a communication service, according to an embodiment.

Referring to FIG. 5, at step 510, an external electronic device 400 may receive a user input that requests activation of a communication service.

At step 520, the external electronic device 400 may receive, from the first external server 450, a list of countries of communication operators that support an activation scheme in which the external electronic device 400 solely performs activation of a communication service.

The external electronic device 400 may control a display 160 to display countries included in the list of the countries. The external electronic device 400 may identify the location of the external electronic device 400 using a GPS module (not illustrated) of the external electronic device 400 or a mobile country code of an emergency network, and may change the list of countries so as to display a country corresponding to the location first.

At step 530, the external electronic device 400 may receive a user input for selecting one of the countries included in the list of countries.

At step 540, the external electronic device 400 may transmit information indicating the selected country to the first external server 450.

At step 550, the external electronic device 400 may receive communication service operator information corresponding to the selected country from the first external server 450. The communication service operator information may include a list of at least one communication operator corresponding to the selected country and communication service activation information for each communication operator.

The external electronic device 400 may control the display 160 to display a list of communication operators, transmitted from the first external server 450.

At step 560, the external electronic device 400 may receive a user input for selecting one of the at least one communication operator included in the list.

At step 570, the external electronic device 400 may access the third external server 490 that provides a profile corresponding to the selected communication operator, and may receive a profile from the external server 490.

Figure 6A:
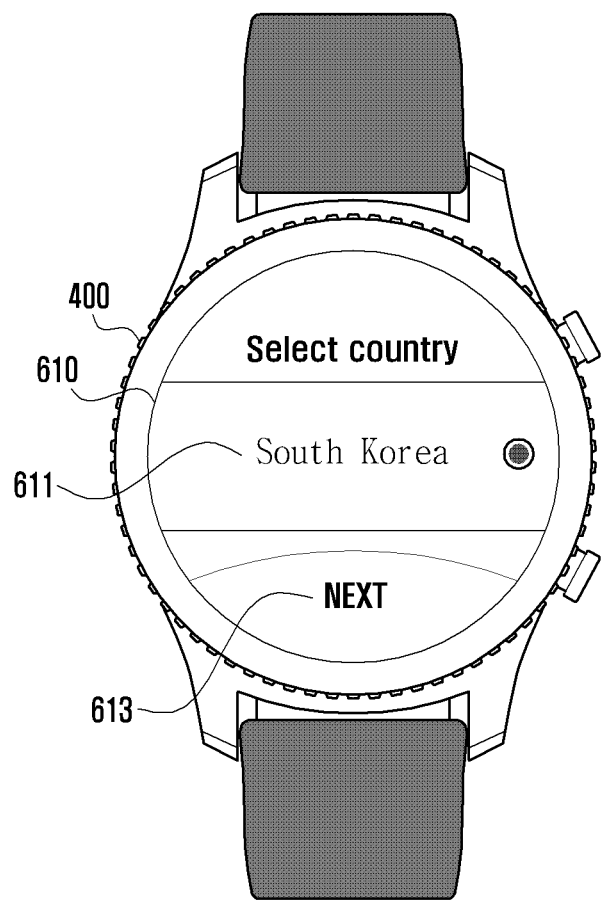
FIG. 6A is a diagram in which an external electronic device performs opening of a communication service, according to an embodiment.
Figure 6B:
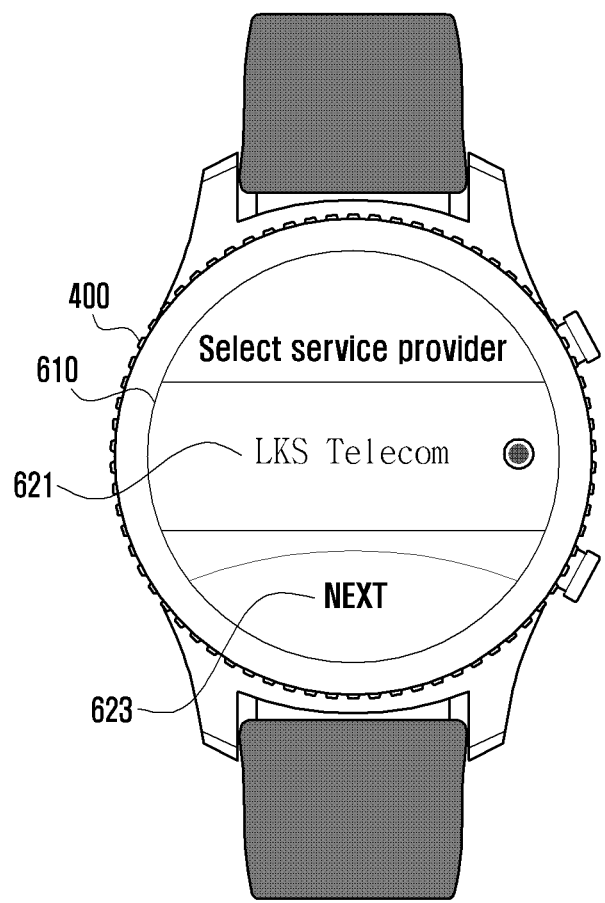
FIG. 6B is a diagram in which an external electronic device performs opening of a communication service, according to an embodiment.

FIG. 6A is a diagram in which an external electronic device performs opening of a communication service, according to an embodiment. FIG. 6B is a diagram in which an external electronic device performs opening of a communication service, according to an embodiment.

Referring to FIG. 6A, the external electronic device 400 may receive a list 611 of countries of communication operators that support an activation scheme in which the external electronic device 400 solely performs activation of a communication service from the first external server 450, and may control the display 610 to display the list of countries. The external electronic device 400 may receive a user input for selecting one of the countries included in the list of countries. The external electronic device 400 may select a country, and may receive a user input 613 for selecting communication operators belonging to the selected country.

Referring to FIG. 6B, the external electronic device 400 may receive communication service operator information associated with communication service operators belonging to the selected country from the first external server 450. The communication service operator information may include a list of at least one communication operator corresponding to the selected country and communication service activation information for each communication operator.

The external electronic device 400 may control the display 610 to display a list 621 of communication operators. The external electronic device 400 may receive a user input 623 for selecting one of the at least one communication operator included in the list. The external electronic device 400 may access the third external server 490 that provides a profile corresponding to the selected communication operator, and may receive a profile from the external server 490.

Figure 7:
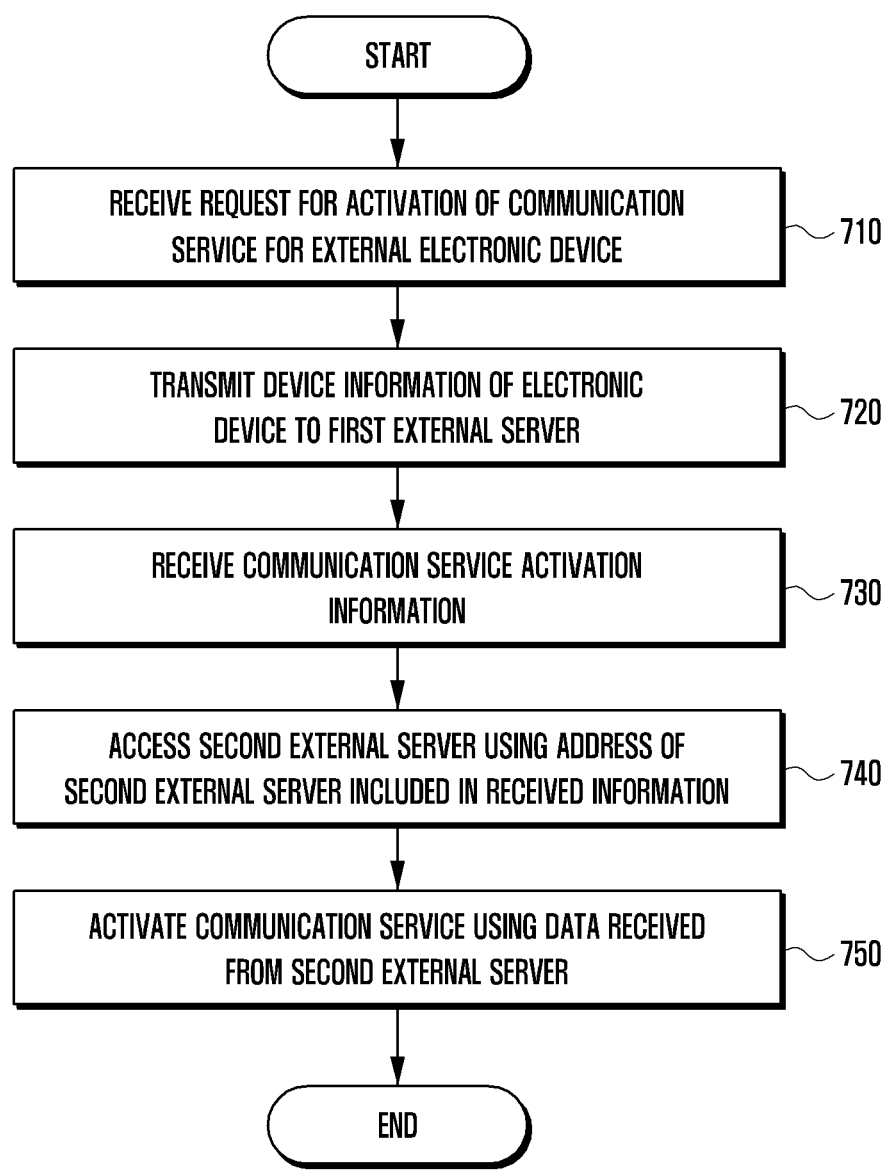
FIG. 7 is a flowchart of an operation in which an electronic device activates the communication service of an external electronic device, according to an embodiment.

FIG. 7 is a flowchart of an operation in which an electronic device performs activation of a communication service for an external electronic device, according to an embodiment.

Referring to FIG. 7, an electronic device 300 may receive a request for activation of a communication service for an external electronic device 400 at step 710. When the external electronic device 400 is connected to the electronic device 300 using a second communication connection for the first time, a request for activation of a communication service for the external electronic device 400 may be transmitted to the electronic device 300.

At step 720, the electronic device 300 may transmit the device information of the electronic device 300 to a first external server 450.

The device information of the electronic device 300 may include all kinds of information which may be used for selecting a communication operator that provides a communication service usable by the electronic device 300 and the external electronic device 400 from among a plurality of pieces of communication operator information the first external server 450 stores. The device information of the electronic device 300 may include a MCC and a MNC.

At step 730, the electronic device 300 may receive information for activation of a communication from the first external server 450.

The first external server 450 may receive device information of the electronic device 300, and may transmit information for activation of a communication service corresponding to the device information of the electronic device 300. The communication service activation information may include at least some from among information indicating an identifier used when an operator providing a communication service identifies a subscriber, the address of the third external server 490, SIM card information provided by a communication service operator, information associated with at least one activation scheme for activating a communication service (e.g., an online opening scheme using the second external server 470, an offline opening scheme performed in a shop of a communication operator, and an activation code-based opening scheme that activates a communication service by inputting an activation code), activation scheme information including priority information associated with a communication service activation scheme, information associated with whether a communication service activation scheme using the second external server 470 is supported, and information indicating whether a service providable to a plurality of electronic devices (e.g., the electronic device 300 and the external electronic device 400) on the basis of the same phone number (e.g., one-number service that transmits or receives a call on the basis of the same phone number) is supportable.

At step 740, the electronic device 300 may access a second external server 470 using the address of the second external server 470 included in the communication service activation information.

At step 750, the electronic device 300 may activate a communication service for the external electronic device 400 using data received from the second external server 470. The data received from the second external server 470 may include a web address provided by a communication service operator. The web address provided by the communication service operator may be an address for accessing a web page at which opening, activation, and cancellation of a communication service provided by the communication service operator and changing a payment system can be performed.

The electronic device 300 may transmit, to the second external server 470, an identifier which is included in the communication service activation information and is to be used when an operator providing a communication service identifies a subscriber. The second external server 470 may transmit a web address at which a service (e.g., a payment system) usable by the external electronic device 400 can be selected, to the electronic device 300 on the basis of the identifier transmitted by the electronic device 300. The electronic device 300 may receive the web address, and may perform an operation of receiving a user input for selecting a payment system at a web page, so as to activate a communication service to be used by the external electronic device 400. The third external server 490 may generate a profile on the basis of the data received from the second external server 470.

The electronic device 300 may receive the profile from the third external server 490, and may perform a step of transmitting the profile to the external electronic device 400 so as to perform activation of a communication service for the external electronic device 400.

Steps 740 and 750 may be performed when an operator that provides a communication service used by the electronic device 300 supports a scheme of activating a communication service using the second external server 470.

When the operator that provides the communication service does not support the scheme of activating a communication service using the second external server 470, the electronic device 300 may identify whether the communication operator supports a scheme of activating a communication service in the offline state at a shop of the communication operator. The electronic device 300 may identify that the communication operator supports the scheme of activating a communication service in the offline state at a shop of the communication operator, may access the address of the third external server 490 included in the information for activation, and may download the profile from the third external server 490.

When the operator that provides the communication service does not support the scheme of activating a communication service using the second external server 470, the electronic device 300 may identify whether the communication operator supports a scheme of activating a communication service using an activation code, on the basis of the information for activation transmitted from the first external server 450. The electronic device 300 may identify that the scheme of activating a communication service using an activation code is supported, and may perform an operation of requesting input of an activation code. The electronic device 300 may control a display 160 to display a screen that requests a user to input an activation code, and may control a camera 180 to receive a QR code.

Figure 8:
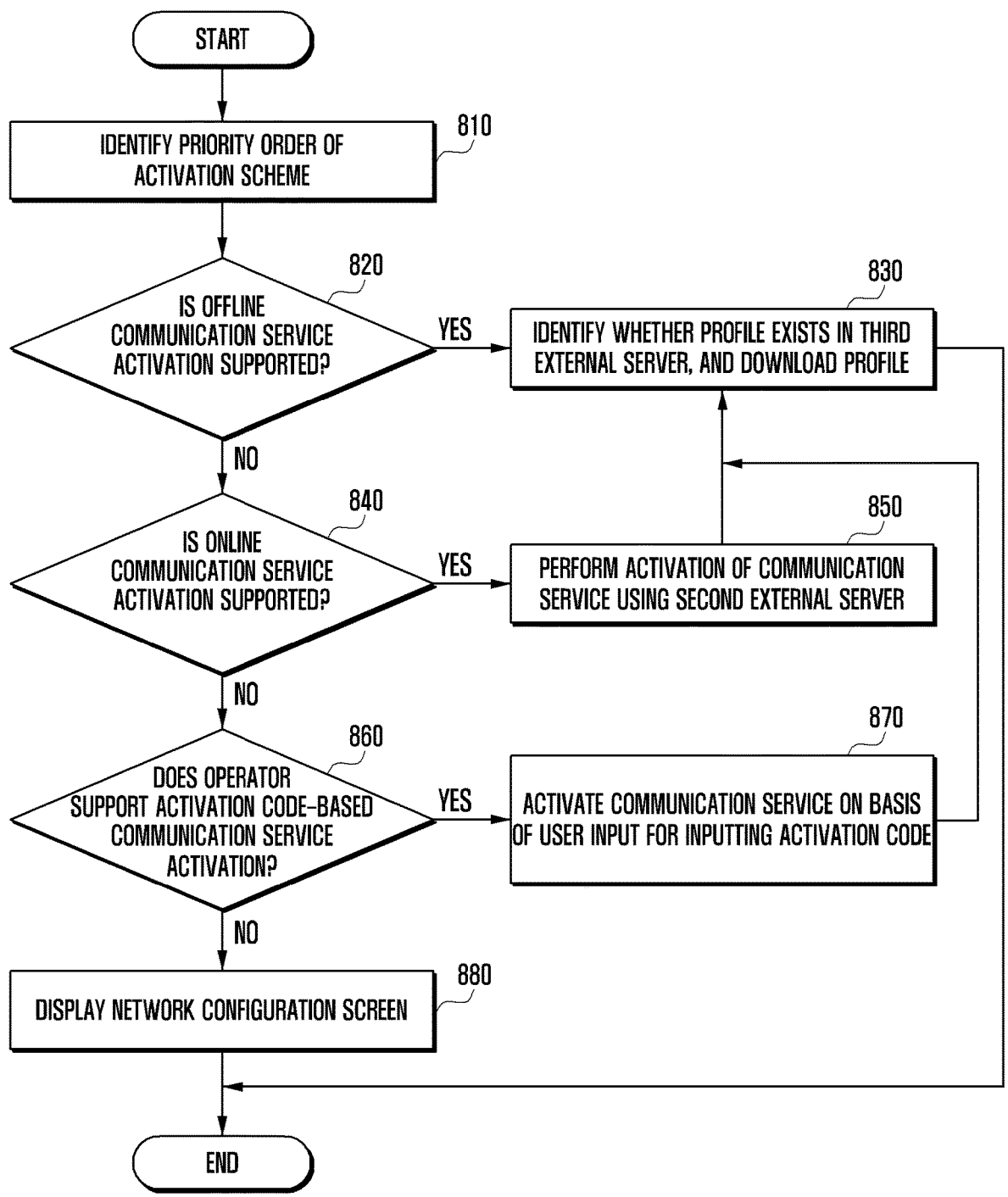
FIG. 8 is a flowchart of an operation in which an electronic device activates a communication service on the basis of priority information of a communication service activation scheme, according to an embodiment.

FIG. 8 is a flowchart of an operation in which an electronic device performs activation of a communication service on the basis of priority information of a communication service activation scheme, according to an embodiment.

Referring to FIG. 8, an electronic device 300 may identify a priority order of an activation scheme at step 810.

Communication service activation information may include information indicating a communication activation scheme supportable by an operator that provides a communication service and a priority order allocated to each activation scheme. Operators that provide communication services may support at least one from among an online activation scheme using the second external server 470, an offline activation scheme performed in a shop of a communication operator, an activation code-based activation scheme that activates a communication service by inputting an activation code, and an activation scheme using the external electronic device 400 without a connection to the electronic device 300. The electronic device 300 may receive communication service activation information from the first external server 450, and may identify a priority order on the basis of the communication service activation information. Alternatively, the electronic device 300 may identify priority information associated with a communication service activation scheme stored in advance in the memory 340.

For ease of description, regarding the information associated with a priority order of an activation scheme, it is assumed that the offline activation scheme performed in a shop of a communication operator is assigned with the highest priority, the online activation scheme using the second external server 470 is assigned with the second highest priority, and the activation code-based activation scheme that activates a communication service by inputting an activation code is assigned with the third highest priority. A priority order is designated variously by an operator or a manufacturer of the electronic device 300, and a priority order different from the above-described priority order may be available.

At step 820, the electronic device 300 may identify whether a communication operator supports the offline activation scheme performed in a shop of the communication operator.

At step 830, the electronic device 300 may identify that the scheme of activating a communication service in the offline state is supported, may access the third external server 490, and may identify whether a profile exists in the third external server 490.

The electronic device 300 transmits a signal for requesting transmission of a profile to the third external server 490, and when the profile exists, the third external server 490 may transmit the profile to the electronic device 300. Step 830 may be performed by the external electronic device 400, as opposed to the electronic device 300. The external electronic device 400 may receive, from the electronic device 300, the address of the third external server 490 included in data related to activation of a communication service, and may access the third external server 490. The external electronic device 400 may transmit, to the third external server 490, a signal for requesting whether a profile corresponding to the external electronic device 400 exists.

When the profile does not exist, the third external server 490 may transmit an indicator indicating that the profile does not exist to the electronic device 300. The electronic device 300 receives the indicator indicating that the profile does not exist, and may proceed with step 840.

At step 840, the electronic device 300 may identify whether the operator providing a communication service supports the online activation scheme using the second external server 470.

The electronic device 300 may identify that downloading of a profile from the third external server 490 fails or that the electronic device 300 does not support offline communication service activation, and may identify whether the operator supports the online activation scheme using the second external server 470.

At step 850, the electronic device 300 may identify that the operator supports the online activation scheme using the second external server 470, and may perform activation of a communication service for the external electronic device 400 using the second external server 470.

The electronic device 300 may access the address of the second external server 470 included in the communication service activation information, and may perform an operation for activation of a communication service for the external electronic device 400 (e.g., an operation of subscribing to a communication service for the external electronic device 400) using the second external server 470. When a signal indicating that activation of a communication service is completed is received, the electronic device 300 may access the address of the third external server 490, and may download a profile from the third external server 490.

At step 860, the electronic device 300 may identify whether the operator providing a communication service supports the activation code-based activation scheme that activates a communication service by inputting an activation code.

At step 870, the electronic device 300 may identify that the operator providing a communication service supports the activation code-based activation scheme that activates a communication service by inputting an activation code, and may request a user input for inputting an activation code. The electronic device 300 may perform activation of a communication service on the basis of the user input that inputs the activation code, may access the third external server 490, and may download a profile from the third external server 490. The descriptions of various embodiments associated with an activation code will be provided with reference to FIGS. 9A and 9B.

At step 880, the electronic device 300 may identify that the operator providing a communication service does not support the activation code-based activation scheme that activates a communication service by inputting an activation code, and may control a display 160 to display a network configuration screen.

The network configuration screen may include activation information received from the second external server 470.

Steps 820, 840, and 860 may be performed in a different order depending on priority. For example, when the online activation scheme has a higher priority than that of the offline activation scheme, step 840 may be performed, and whether to perform step 820 may be determined on the basis of the result of step operation 840.

The steps in FIG. 8 may be performed by the external electronic device 400. The external electronic device 400 may perform data transmission or reception with the second external server 470 and the third external server 490 using a communication network provided by the electronic device 300. When the communication service provider supports the online communication service activation, the external electronic device 400 may access the second external server 470 and perform activation of a communication service for the external electronic device 400. The external electronic device 400 may access the third external server 490 and may download a profile from the third external server 490.

Figure 9A:
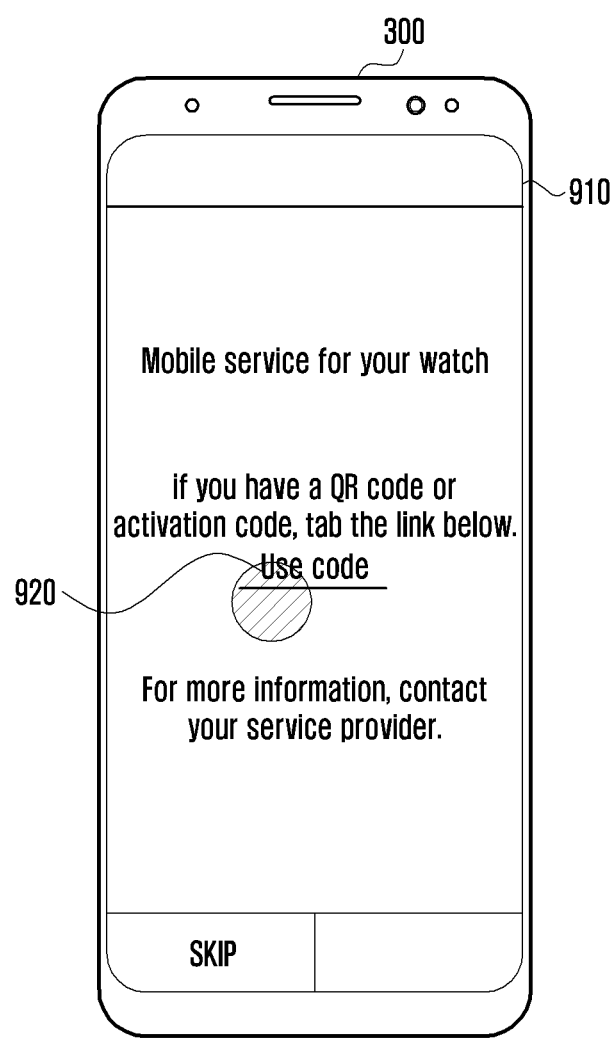
FIG. 9A is a diagram in which an electronic device activates a communication service, according to an embodiment.
Figure 9B:
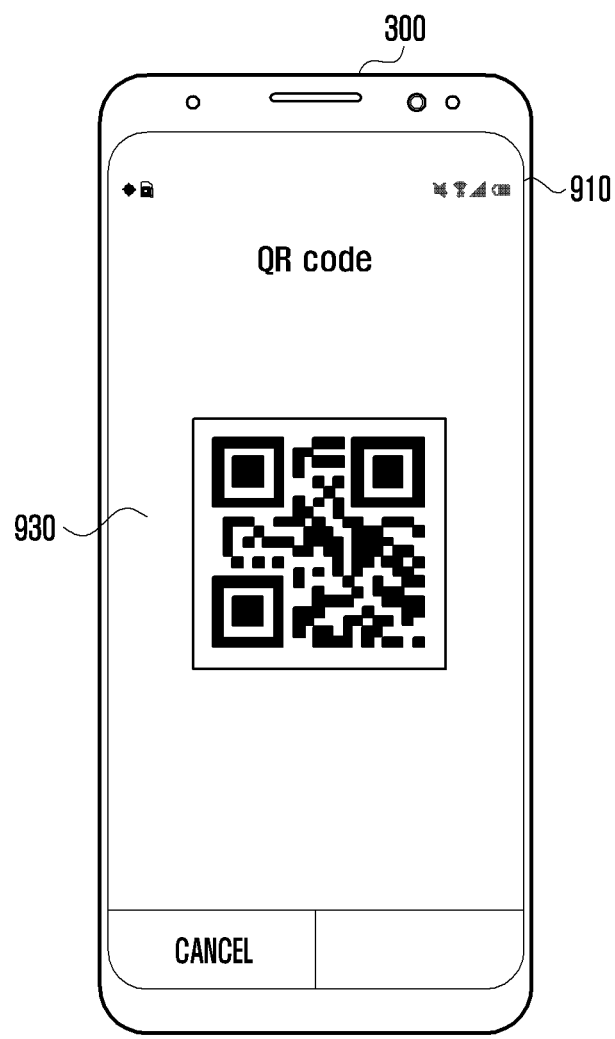
FIG. 9B is a diagram in which an electronic device activates a communication service, according to an embodiment.

FIG. 9A is a diagram in which an electronic device performs activation of a communication service using an activation code, according to an embodiment. FIG. 9B is a diagram in which an electronic device performs activation of a communication service using an activation code, according to an embodiment.

Referring to FIGS. 9A and 9B, the electronic device 300 may control a display 910 to display a screen to receive a user input 920 for inputting an activation code.

Referring to FIG. 9A, the electronic device 300 may control the display 910 to display a message that requests input of an activation code when a user has an activation code.

The activation code 930 may indicate a key for performing activation of a communication service for the external electronic device 400. The activation code 930 may be implemented as a key obtained by combining characters, numbers, or special characters, or may be implemented in the form of a QR code.

Referring to FIG. 9B, when a user has an activation code 930 implemented in the form of a QR-code, the electronic device 300 may activate a camera 180 in order to receive input of a QR-code, and may capture an object including the QR-code using the camera 180. The electronic device 300 may capture the QR-code, and analyze the QR-code so as to obtain the activation code 930. The electronic device 300 may perform activation of a communication service for the external electronic device 400 on the basis of the obtained activation code 930.

Figure 10:
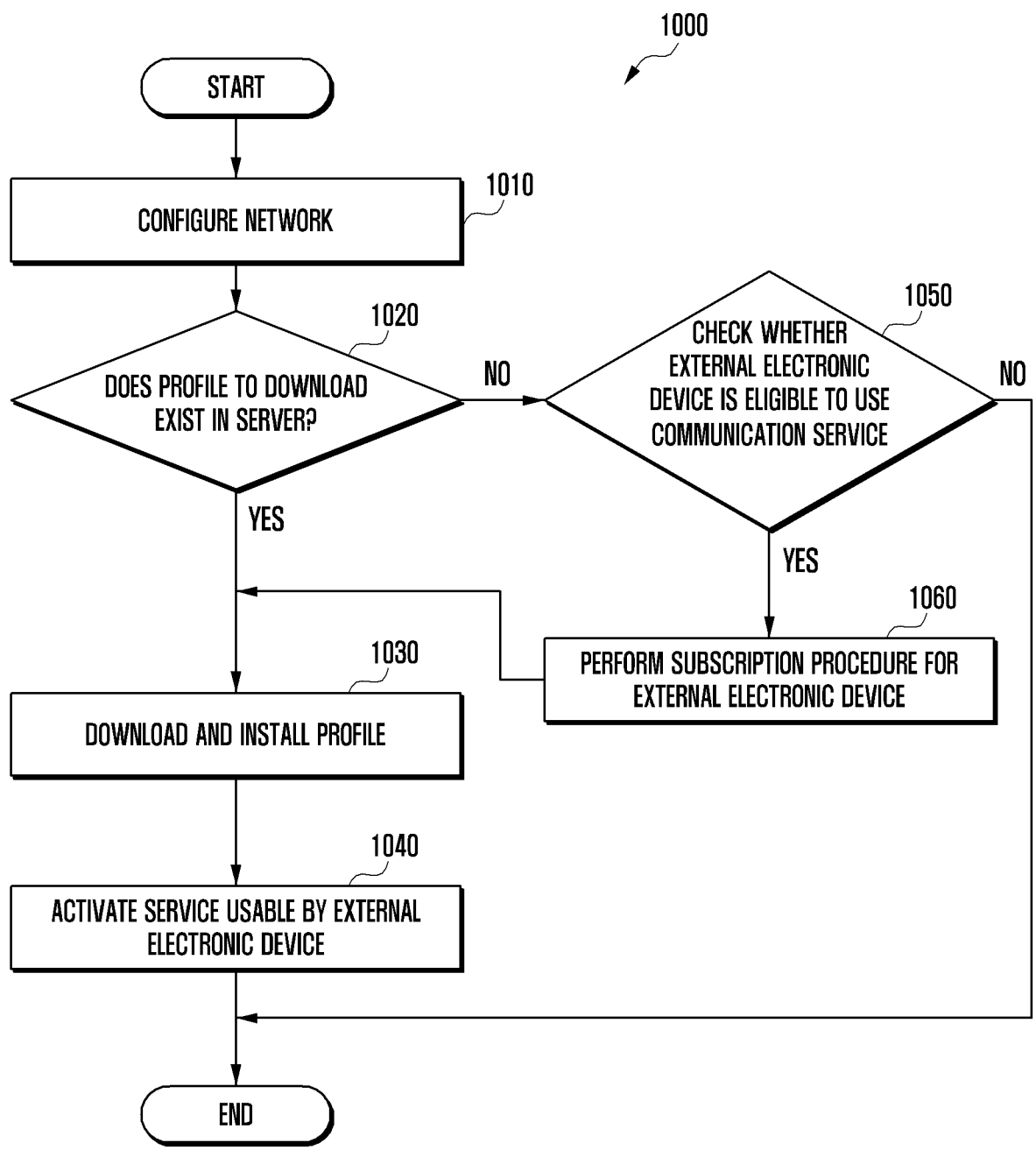
FIG. 10 is a flowchart of an operation in which an electronic device performs downloading and installation of a profile in an external electronic device, according to an embodiment.

FIG. 10 is a flowchart of an operation in which an electronic device performs downloading and installation of a profile in an external electronic device, according to an embodiment.

Referring to FIG. 10, at step 1010, the external electronic device 400 may configure a network that may be connected to the first external server 450, the second external server 470, or the third external server 490. The external electronic device 400 may transmit a request signal to the electronic device 300 in order to use a first communication connection corresponding to a first communication scheme (e.g., a cellular network or Wi-Fi), which indicates a communication scheme that enables a connection to the first external server 450, the second external server 470, or the third external server 490. The electronic device 300 may provide the first communication connection to the external electronic device 400 in response to the request signal.

The external electronic device 400 may receive information for activation of a communication service for the external electronic device 400 from the first external server 450, and may access the third external server 490 included in the received information.

At step 1020, the external electronic device 400 may identify whether a profile to download exists in the third external server.

The external electronic device 400 may access the third external server 490 using the address of the third external server 490, which is included in the communication service activation information received from the electronic device 300 or the first external server 450.

In order to receive the profile, the external electronic device 400 may access the address of the third external server 490 included in the activation information, and may attempt to download the profile from the server if the external electronic device 400 successfully accesses.

When the profile to download exists, the external electronic device 400 may download the profile and install the profile at step 1030. The external electronic device 400 may perform an operation of installing the profile transmitted from the third external server 490 in an UICC of the external electronic device 400.

At step 1040, the external electronic device 400 may activate a service usable by the external electronic device 400. The external electronic device 400 may activate the service usable by the external electronic device 400 on the basis of data transmitted from the electronic device 300. To this end, the electronic device 300 may transmit device information of the external electronic device 400 to the second external server 470, and may request an identifier of a service usable by the external electronic device 400 from the second external server 450. The second external server 470 may transmit at least one identifier corresponding to a service usable by the external electronic device 400 to the electronic device 300. The electronic device 300 may transmit, to the second external server 470, a service activation request signal for requesting activation of at least one of the services usable by the external electronic device 400. The second external server 470 may transmit configuration information related to the service to the electronic device 300 in response to reception of the service activation request signal. The electronic device 300 may activate the service usable by the external electronic device 400, using the configuration information transmitted from the external server 450. Alternatively, the electronic device 300 may activate the service usable by the external electronic device 400 using configuration information corresponding to the identifier of the service to be activated, from among configuration information stored in a memory 340.

When the electronic device 300 receives an indication indicating that a profile that the electronic device 300 needs to download does not exist in a profile provision server, the electronic device 300 may transmit an eligibility check request message to the second external server 470. The electronic device 300 may receive, from the profile provision server, the indication indicating that the profile that the electronic device 300 needs to download does not exist in the profile provision server. The electronic device 300 may receive the indication indicating that the profile that the electronic device 300 needs to download does not exist in the profile provision server, and may determine that the profile does not exist in the profile provision server.

The second external server 470 may check whether the communication service used by a user of the electronic device 300 has eligibility to use the external electronic device 400. The eligibility to use the external electronic device 400 may indicate eligibility associated with whether the communication service used by the user of the electronic device 300 is usable by the external electronic device 400 at the same time, or may indicate eligibility associated with whether the external electronic device 400 is eligible to solely use the communication service.

At step 1060, the electronic device 300 may perform an operation of subscribing to a communication service. The second external server 470 may determine that the communication service used by the user of the electronic device 300 has eligibility to use the external electronic device 400, and may transmit, to the electronic device 300, a web address at which subscription to the communication service is to be performed. The electronic device 300 may display, on a display, a communication service subscription page used for subscription to the communication service. The electronic device 300 and the second external server 470 may perform operations for subscribing to the communication service for the external electronic device 400, and may perform downloading and installation of the profile as described at step 1030.

FIG. 11 is a flowchart of an operation in which an electronic device performs downloading a profile, and installation of the profile in an external electronic device, according to an embodiment.

Referring to FIG. 11, at step 1101, the electronic device 300 and the external electronic device 400 may establish a communication connection for mutual connection via various communication schemes. The electronic device 300 and the external electronic device 400 may establish a mutual connection using a short-range communication scheme (e.g., Bluetooth™, NFC, or the like).

At step 1103, the electronic device 300 may perform user authentication with the second external server 470. The user authentication between the electronic device 300 and the second external server 470 may use a defined authentication scheme such as OAuth, but an authentication scheme is not limited.

At step 1105, the electronic device 300 may transmit an eligibility check request signal to the second external server 470.

The electronic device 300 may generate a token to communicate with the second external server 470. The generated token may be used for communication between the electronic device 300 and the second external server 470, which is performed for subscription to a communication service for the external electronic device 400.

The electronic device 300 may transmit device information of the electronic device 300 for an operation performed by a first external server 450 to check whether the electronic device 300 is eligible for a communication service. The device information of the electronic device 300 may include identification information of the electronic device 300. The identification information may include various pieces of information for distinguishing the electronic device 300 from other electronic devices, such as an IMSI of the electronic device 300, the MAC address of the electronic device 300, a serial number defined by the manufacturer of the electronic device 300, and the like.

The second external server 470 may identify the eligibility of the electronic device 300 on the basis of identification information of the electronic device 300 transmitted from the electronic device 300. The eligibility of the electronic device 300 may include the fact that the communication service payment system of the electronic device 300 is eligible to support the communication service for the external electronic device 400.

The second external server 470 may transmit an eligibility check response signal to the electronic device 300 at step 1107. The eligibility check response signal may include the result of checking, by the second external server 470, whether the eligibility is capable of supporting the communication service for the external electronic device 400

At step 1109, the electronic device 300 may transmit a communication service subscription request signal to the second external server 470. The communication service subscription request signal may indicate a signal for requesting subscription to a communication service in which the external electronic device 400 performs communication using a cellular network.

The communication service subscription request signal may include a signal for requesting a web address at which the terms and conditions for use of the communication service are written and agreement about the terms and conditions can be input. The electronic device 300 may transmit identification information of the external electronic device 400 (e.g., the IMSI of the external electronic device 400) together with the communication service subscription request signal.

At step 1111, the second external server 470 may transmit, to the electronic device 300, a web address used for subscription to the communication service.

At step 1113, the second external server 470 and the electronic device 300 may proceed with an operation of subscribing to the communication service for the external electronic device 400.

The second external server 470 may transmit, to the electronic device 300, the web address at which the terms and conditions for use of the communication service are written and agreement about the terms and conditions can be input. When the terms and conditions applied when a user uses the communication service and input data associated with agreement about the terms and conditions exist, the second external server 470 may not need to transmit the web address at which the terms and conditions for use of the communication service are written and agreement about the terms and conditions can be input.

The electronic device 300 may transmit a request signal for selecting the payment system of the communication service to the second external server 470. The second external server 470 may transmit, to the electronic device 300, various payment system information provided for the communication service. The electronic device 300 may output the payment system information on the display, receive a user input for selecting a payment system, and may transmit the user input to the second external server 470.

In response to completion of subscription to the communication service to be used by the external electronic device 400, the second external server 470 may transmit, to the third external server 490, a signal that requests generation of a profile to be installed in the external electronic device 400. The third external server 490 may receive the signal for requesting generation of a profile, and may generate the profile of the external electronic device 400.

Steps 1111 and 1113 may be omitted when the subscription to the communication service for the external electronic device 400 is completed.

At step 1115, the external electronic device 400 may transmit, to the third external server 490, a profile transmission request signal that requests transmission of the profile.

The external electronic device 400 may identify the address of the third external server 490 using the activation information received from the electronic device 300, may access the identified address, and may attempt to download the profile. When the profile that the external electronic device 400 needs to download exists in the third external server 490, the external electronic device 400 may download the profile.

The external electronic device 400 may perform data transmission or reception with the second external server 470 and the third external server 490 using the communication network provided by the electronic device 300. In this instance, the external electronic device 400 may identify the address of the third external server 490 using the activation information received from the first external server 450, may access the identified address, and may attempt to download the profile. When the profile that the external electronic device 400 needs to download exists in the third external server 490, the external electronic device 400 may download the profile.

At step 1117, the third external server 490 may transmit the generated profile to the external electronic device 400. At step 1119, the external electronic device 400 may perform at least a part of the operation of installing the downloaded profile. The operation of installing the profile in the external electronic device 400 may be performed according to the standard specifications defined in GSMA SGP.22.

The profile may be received as a profile package which is in an encrypted form. The external electronic device 400 may decrypt the encrypted profile package, and may install the profile in an UICC included in the external electronic device 400 using the decrypted profile package. The process of installing the profile may be performed using an OTA technology. An encryption key used for encryption and decryption may be an encryption key generated via mutual authentication between the electronic device 300 and the third external server 490. The encryption scheme may conform with the standard specification defined in GSMA SGP.22, but is not limited thereto.

At step 1121, the external electronic device 400 may transmit, to the electronic device 300, a message indicating that the installation of the profile is completed.

At step 1123, the electronic device 300 may transmit a signal for requesting activation of a service to the second external server 470. The service may indicate various communication services for external electronic device 400 using a cellular network provided by a communication service operator. When transmitting the signal for requesting activation of a service to the second external server 470, the electronic device 300 may request transmission of configuration information required for using the service.

At step 1125, the second external server 470 may perform activation of the service, and may transmit configuration information related to the activated service to the electronic device 300.

The electronic device 300 may store configuration information related to a service usable by the external electronic device 400 in advance in the memory 340. When the configuration information is stored in the memory 340, the electronic device 300 may not request the second external server 470 to transmit configuration information. When the configuration information is stored in the memory 340, the electronic device 300 may retrieve configuration information corresponding to an identifier of a service which is to be activated, from the memory 340, and may use the configuration information.

At step 1127, the external electronic device 400 and the electronic device 300 may perform activation of the service using the configuration information.

The second external server 470 may transmit configuration information to be used for using the service to the electronic device 300, after activation of the service. The processor 330 may perform activation of the communication service using the received configuration information so that the external electronic device 400 may use the activated service. Alternatively, the external electronic device 400 may perform activation of the communication service using the configuration information transmitted from the processor 330.

The service may include an one-number service in which a plurality of electronic devices (e.g., the electronic device 300 and the external electronic device 400) transmit or receive a call on the basis of the same phone number, an automatic phone call forwarding service that forwards a phone call to another electronic device when one of the plurality of electronic devices receives the phone call but does not answer the phone call, a cellular modem ON/OFF service that automatically activates/deactivates a modem that uses cellular communication, a message sync service that synchronizes a message and phone call transmission/reception history between a plurality of electronic devices, a phone call history sync service, or the like.

The second external server 470 may identify whether the user of the electronic device 300 and the user of the external electronic device 400 are the same user, and whether the electronic device 300 and the external electronic device 400 are operable on the basis of the same number. The second external server 470 may activate the one-number service on the basis of the result of the identification, and may transmit configuration information associated with the one-number service to the electronic device 300. The processor 300 may perform activation of the communication service usable by the external electronic device 400, using the received configuration information. Alternatively, the external electronic device 400 may perform activation of the communication service using the configuration information transmitted from the processor 330.

The electronic device 300 may identify whether the one-number service is activated for the external electronic device 400 on the basis of the device information of the external electronic device 400. On the basis of the identification result which shows that the one-number service is activated, the electronic device 300 may transmit configuration information for deactivating the automatic phone call forwarding function to the external electronic device 400.

The electronic device 300 may identify whether the one-number service is activated for the external electronic device 400 on the basis of the device information of the external electronic device 400. On the basis of the identification result which shows that the one-number service is activated, the electronic device 300 may activate an automatic cellular modem activation/deactivation function based on whether the external electronic device 400 and the electronic device 300 are connected using a short-range communication scheme.

The configuration information may be requested and received during the service subscription step 1113, as opposed to steps 1123 and 1125. In this instance, the configuration information may be used in the profile installation step 1119.

The activation of the service at step 1127 may be performed under the control of the electronic device 300, but the disclosure is not limited thereto. The external electronic device 400 may receive configuration information related to activation of a service, and may autonomously perform activation of the service without control by the electronic device 300.

Although not illustrated in FIG. 11, the second external server 470 may request the electronic device 300 to transmit an indication indicating whether to activate a communication service for the external electronic device 400.

According to an embodiment, an electronic device may include a memory configured to store device information of the electronic device, a first communication module configured to establish a first communication connection to a first external server and a second external server, where the first external server stores information associated with a plurality of operators that provide cellular communication services and the second external server is related to activation of a communication service, a second communication module configured to establish a second communication connection to an external electronic device, and a processor. The processor is configured to receive a signal for requesting activation of a communication service for the external electronic device from the external electronic device using the second communication module, transmit device information of the electronic device to the first external server using the first communication module, receive information for activation of the communication service from the first external server, access the second external server on the basis of an address of the second external server which is included in the information for activation of the communication service, and perform activation of the communication service for the external electronic device using data transmitted from the second external server.

In the electronic device, the processor may be configured to perform activation of the communication service for the external electronic device on the basis of at least one activation scheme information for activation of the communication service which is included in the information for activation of the communication service and a priority order of the at least one activation scheme information. In the electronic device, the at least one activation scheme information may include information associated with whether an operator that provides the communication service supports a scheme of opening a communication service in an offline state, information associated with whether the operator supports a scheme of opening a communication service in an online state, or information associated with whether the operator supports a scheme based on a provided activation code.

In the electronic device, the processor may be configured to identify whether the scheme of opening a communication service in the offline state is supported, on the basis of the activation scheme information, and identify that the scheme of opening a communication service in the offline state is supported, and transmit, to a server that provides a profile to be installed in the external electronic device, a signal for requesting provision of the profile.

In the electronic device, the processor may be configured to identify that the scheme of opening a communication service in the offline state is not supported, and identify whether the scheme of opening a communication service in the online state is supported, on the basis of the activation scheme information, and identify that the scheme of opening a communication service in the online state is supported, and transmit, to the second external server, a signal for requesting activation of the communication service.

In the electronic device, the processor may be configured to perform activation of the communication service via the second external server using an authentication method that is supportable by the second external service and is included in the information for activation of the communication service.

In the electronic device, the processor may be configured to identify that the scheme of opening a communication service in the online state is not supported, on the basis of the activation scheme information, and identify whether the scheme of opening a communication service using an activation code is supported, on the basis of the activation information, and identify that the scheme of opening a communication service using an activation code is supported, and request a user input for inputting an activation code.

In the electronic device, the information for activation of the communication service may include information indicating whether a service providable to the electronic device and the external electronic device on the basis of the same phone number is supported.

In the electronic device, the information for activation of the communication service may include information indicating an identifier used when an operator that provides the communication service identifies a subscriber, and the processor may be configured to transmit one of a plurality of identifiers corresponding to the external electronic device to the second external server on the basis of information indicating the identifier.

In the electronic device, the device information of the electronic device may include an MCC and an MNC, and the processor may be configured to when a plurality of pieces of operator information are included in the information for activation of the service, received from the first external server, select one piece of operator information from among the plurality of pieces of operator information on the basis of communication network information stored in a SIM module that stores communication network information used by the electronic device, and transmit a signal for requesting activation of the communication service from the second external server corresponding to the selected user information.

According to an embodiment, a first external server may include a memory configured to store information associated with operators that provide communication services, a communication module configured to perform data transmission or reception with a first external electronic device using a first communication scheme, and a processor configured to receive a first signal for requesting transmission of the information for activation of a communication service, transmitted from the first external electronic device, identify device information of the first external electronic device included in the first signal, select an operator corresponding to the device information of the first external electronic device from among the operators, and transmit information for activation of a communication service corresponding to the selected operator to the first external electronic device.

In the first external server, the information for activation of the communication service may include communication service activation scheme information including information indicating whether an operator that provides the communication service supports a scheme of opening a communication service in an offline state, information indicating whether the operator supports a scheme of opening a communication service in an online state, or information indicating whether the operator supports a scheme based on a provided activation code, and priority information of the communication service activation scheme.

In first external server, when the operator supports the scheme of opening a communication service in the online state, the information for activation of the communication service may include an address of a server that performs an operation related to activation of the communication service.

In the first external server, the information for activation of the communication service may include information indicating an identifier used when the operator that provides the communication service identifies a subscriber.

According to an embodiment, an operation method by an electronic device may include receiving a signal for requesting activation of a communication service for an external electronic device from the external electronic device, transmitting device information of the electronic device to a first external server that stores information associated with a plurality of operators that provide communication services, receiving information for activation of the communication service from the first external server, accessing a second external server on the basis of an address of the second external server which is related to activation of the communication service, the address being included in the information for activation of the communication service, and performing activation of the communication service for the external electronic device using data transmitted from the second external server.

In the operation method by the electronic device, the operation of activating the cellular communication service may include performing activation of the communication service for the external electronic device on the basis of at least one activation scheme information, which is included in the information for activation of the communication service and is used for activation of the communication service, and a priority order of the at least one activation scheme information.

In the operation method by the electronic device, the information for activation of the communication service may include information indicating whether an operator that provides the communication service supports a scheme of opening a communication service in an offline state, information indicating whether the operator supports a scheme of opening a communication service in the online state, or information indicating whether the operator supports a scheme based on a provided activation code.

In the operation method by the electronic device, the information for activation of the communication service may include information indicating an identifier used when the operator that provides the communication service identifies a subscriber, and the method may further include transmitting one of a plurality of identifiers corresponding to the external electronic device to the second external server on the basis of information indicating the identifier.

In the operation method by the electronic device, the device information of the electronic device may include an MCC and an MNC, and the method may further include when a plurality of pieces of operator information are included in the information for activation of the communication service, received from the first external server, selecting a piece of operator information from the plurality of pieces of operator information on the basis of the communication information stored in a SIM module, and transmitting a signal for requesting activation of the communication service from the second external server corresponding to the selected user information.

In the operation method by the electronic device, the information for activation of the communication service may include information indicating whether a service providable to the electronic device and the external electronic device on the basis of the same phone number is supported.

The electronic device may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a memory configured to store device information of the electronic device;
   a first communication module configured to establish a first communication connection to a first external server and a second external server, wherein the first external server stores information associated with a plurality of operators that provide cellular communication services and the second external server is related to activation of a communication service;
   a second communication module configured to establish a second communication connection to an external electronic device; and
   a processor configured to:
   receive a signal for requesting activation of a communication service for the external electronic device from the external electronic device using the second communication module;
   transmit device information of the electronic device to the first external server using the first communication module;
   receive information for activation of the communication service from the first external server;
   access the second external server on the basis of an address of the second external server which is included in the information for activation of the communication service; and
   perform activation of the communication service for the external electronic device using data transmitted from the second external server on the basis of a priority order of at least one activation scheme information.

2. The electronic device of claim 1, wherein the processor is further configured to perform activation of the communication service for the external electronic device on the basis of the at least one activation scheme information for activation of the communication service which is included in the information for activation of the communication service.

3. The electronic device of claim 2, wherein the at least one activation scheme information comprises information associated with whether an operator that provides the communication service supports a scheme of opening a communication service in an offline state, information associated with whether the operator supports a scheme of opening a communication service in an online state, or information associated with whether the operator supports a scheme based on a provided activation code.

4. The electronic device of claim 3, wherein the processor is further configured to:
   identify whether the scheme of opening a communication service in the offline state is supported on the basis of the activation scheme information; and
   identify that the scheme of opening a communication service in the offline state is supported and transmit, to a server that provides a profile to be installed in the external electronic device, a signal for requesting provision of the profile.

5. The electronic device of claim 4, wherein the processor is further configured to:
   identify that the scheme of opening a communication service in the offline state is not supported, and whether the scheme of opening a communication service in the online state is supported, on the basis of the activation scheme information; and
   identify that the scheme of opening a communication service in the online state is supported, and transmit, to the second external server, a signal for requesting activation of the communication service.

6. The electronic device of claim 5, wherein the processor is further configured to perform activation of the communication service via the second external server using an authentication method that is supportable by the second external service and is included in the information for activation of the communication service.

7. The electronic device of claim 5, wherein the processor is further configured to:
   identify that the scheme of opening a communication service in the online state is not supported, on the basis of the activation scheme information, and whether the scheme of opening a communication service using an activation code is supported, on the basis of the activation information, and
   identify that the scheme of opening a communication service using an activation code is supported, and request a user input for inputting an activation code.

8. The electronic device of claim 1, wherein the information for activation of the communication service comprises:
   information indicating whether a service providable to the electronic device and the external electronic device on the basis of the same phone number is supported.

9. The electronic device of claim 1, wherein the information for activation of the communication service comprises information indicating an identifier used when an operator that provides the communication service identifies a subscriber, and
   wherein the processor is further configured to transmit one of a plurality of identifiers corresponding to the external electronic device to the second external server on the basis of the information indicating the identifier.

10. The electronic device of claim 1, wherein the device information of the electronic device comprises a mobile country code (MCC) and a mobile network code (MNC), and
    wherein the processor is further configured to:
    when a plurality of pieces of operator information are included in the information for activation of the service received from the first external server, select one piece of operator information from among the plurality of pieces of operator information on the basis of communication network information stored in a subscriber identification module (SIM) module that stores communication network information used by the electronic device, and
transmit a request for activation of the communication service from the second external server corresponding to the selected user information.

11. An electronic device, comprising:
a memory configured to store information associated with operators that provide communication services;
a communication module configured to perform data transmission or reception with a first external electronic device using a first communication scheme; and
a processor configured to:
receive a first signal for requesting transmission of the information for activation of a communication service transmitted from the first external electronic device;
identify device information of the first external electronic device included in the first signal;
select an operator corresponding to the device information of the first external electronic device from among the operators; and
transmit information for activation of a communication service corresponding to the selected operator to the first external electronic device,
wherein the information for activation of the communication service comprises priority information of a communication service activation scheme.

12. The electronic device of claim 11, wherein the information for activation of the communication service comprises the communication service activation scheme information including information indicating whether an operator that provides the communication service supports a scheme of opening a communication service in an offline state, or information indicating whether the operator supports a scheme of opening a communication service in an online state, or information indicating whether the operator supports a scheme based on a provided activation code.

13. The electronic device of claim 12, wherein, when the operator supports the scheme of opening a communication service in the online state, the information for activation of the communication service comprises an address of a server that performs an operation related to activation of the communication service.

14. The electronic device of claim 11, wherein the information for activation of the communication service comprises information indicating an identifier used when the operator that provides the communication service identifies a subscriber.

15. An operation method by an electronic device, the method comprising:
receiving a signal for requesting activation of a communication service for an external electronic device from the external electronic device;
transmitting device information of the electronic device to a first external server that stores information associated with a plurality of operators that provide communication services;
receiving information for activation of the communication service from the first external server;
accessing a second external server on the basis of an address of the second external server which is related to activation of the communication service, the address being included in the information for activation of the communication service; and
performing activation of the communication service for the external electronic device using data transmitted from the second external server on the basis of a priority order of at least one activation scheme information.

16. The method of claim 15, wherein activating the communication service comprises:
performing activation of the communication service for the external electronic device on the basis of the at least one activation scheme information, which is included in the information for activation of the communication service and is used for activation of the communication service.

17. The method of claim 16, wherein the information for activation of the communication service comprises information indicating whether an operator that provides the communication service supports a scheme of opening a communication service in an offline state, information indicating whether the operator supports a scheme of opening a communication service in an online state, or information indicating whether the operator supports a scheme based on a provided activation code.

18. The method of claim 15, wherein the information for activation of the communication service comprises information indicating an identifier used when the operator that provides the communication service identifies a subscriber, and
wherein the method further comprises:
transmitting one of a plurality of identifiers corresponding to the external electronic device to the second external server on the basis of the information indicating the identifier.

19. The method of claim 15, wherein the device information of the electronic device comprises a mobile country code (MCC) and a mobile network code (MNC), and
wherein the method further comprises:
when a plurality of pieces of operator information are included in the information for activation of the service, received from the first external server, selecting a piece of operator information from the plurality of pieces of operator information on the basis of the communication information stored in a subscriber identification module (SIM) module; and
transmitting a request for activation of the communication service from the second external server corresponding to the selected user information.

20. The method of claim 15, wherein the information for activation of the communication service comprises:
information indicating whether a service providable to the electronic device and the external electronic device on the basis of the same phone number is supported.

* * * * *